United States Patent
Kim et al.

(10) Patent No.: US 9,554,234 B2
(45) Date of Patent: Jan. 24, 2017

(54) METHOD AND DEVICE FOR DEVICE TRIGGER/SMALL DATA EXCHANGE/COLLECTION IN WIRELESS COMMUNICATION SYSTEM

(71) Applicant: LG ELECTRONICS INC., Seoul (KR)

(72) Inventors: Laeyoung Kim, Anyang-si (KR); Jaehyun Kim, Anyang-si (KR); Taehyeon Kim, Anyang-si (KR); Hyunsook Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/432,731

(22) PCT Filed: Oct. 1, 2013

(86) PCT No.: PCT/KR2013/008779
§ 371 (c)(1),
(2) Date: Mar. 31, 2015

(87) PCT Pub. No.: WO2014/054876
PCT Pub. Date: Apr. 10, 2014

(65) Prior Publication Data
US 2015/0271623 A1  Sep. 24, 2015

Related U.S. Application Data

(60) Provisional application No. 61/708,594, filed on Oct. 1, 2012, provisional application No. 61/858,624, filed (Continued)

(51) Int. Cl.
*H04W 4/00* (2009.01)
*H04W 4/14* (2009.01)

(52) U.S. Cl.
CPC ............... *H04W 4/005* (2013.01); *H04W 4/14* (2013.01)

(58) Field of Classification Search
CPC .......... H04W 4/14; H04W 4/005; H04W 4/12; H04W 76/02; H04W 36/0055
See application file for complete search history.

(56) References Cited

U.S. PATENT DOCUMENTS

2014/0003313 A1* 1/2014 Jain ........................ H04W 28/08
370/311
2015/0181564 A1* 6/2015 Rao ........................ H04W 24/04
370/329

FOREIGN PATENT DOCUMENTS

KR  10-2011-0122643  11/2011
KR  10-2012-0011012  2/2012
(Continued)

OTHER PUBLICATIONS

Motorola Mobility, "Collapse Trigger Messages," SA WG2 #92, S2-122855, Jul. 2012, 3 pages.
(Continued)

*Primary Examiner* — Liton Miah
(74) *Attorney, Agent, or Firm* — Lee Hong Degerman Kang & Waimey

(57) ABSTRACT

According to one embodiment of the present invention, a method for exchanging/collecting a device trigger by a short message service-service center (SMS-SC) in a wireless communication system comprises the steps of: receiving a first message including an old trigger reference number from a machine type communications-interworking function (MTC-IWF); and deleting a trigger message corresponding to the old trigger reference number, wherein when the first message further includes a new trigger reference number, the SMS-SC detects the trigger message and stores a new
(Continued)

trigger message corresponding to the new trigger reference number.

15 Claims, 13 Drawing Sheets

Related U.S. Application Data on Jul. 26, 2013, provisional application No. 61/882,633, filed on Sep. 26, 2013.

(56) References Cited

FOREIGN PATENT DOCUMENTS

| KR | 10-2012-0096138 | 8/2012 |
|---|---|---|
| WO | 2010/127149 | 11/2010 |

OTHER PUBLICATIONS

Motorola Mobility, "Key Issue on Canceling Previously Submitted Trigger Messages," SA WG2 #92, S2-123299, Jul. 2012, 3 pages.
Panasonic, "Reject of DT request after HSS Interrogation," SA WG2 #91, S2-122316, May 2012, 3 pages.
Panasonic, "Reject of DT request after HSS Interrogation," SA WG2 #92, S2-122734, Jul. 2012, 3 pages.
3rd Generation Partnership Project (3GPP), "Technical Specification Group Services and System Aspects; System improvements for Machine-Type Communications (MTC) (Release 11)," 3GPP TR 23.888 V11.0.0, Sep. 2012, 166 pages.
3rd Generation Partnership Project (3GPP), "Technical Specification Group Services and System Aspects; Machine-Type and other Mobile Data Applications Communications Enhancements (Release 12)," 3GPP TR 23.887 V0.2.1, Aug. 2012, 33 pages.
PCT International Application No. PCT/KR2013/008779, Written Opinion of the International Searching Authority dated Jan. 2, 2014, 16 pages.

* cited by examiner

METHOD AND DEVICE FOR DEVICE TRIGGER/SMALL DATA EXCHANGE/COLLECTION IN WIRELESS COMMUNICATION SYSTEM

CROSS-REFERENCE TO RELATED APPLICATIONS

This application is the National Stage filing under 35 U.S.C. 371 of International Application No. PCT/KR2013/008779, filed on Oct. 1, 2013, which claims the benefit of U.S. Provisional Application Ser. No. 61/708,594, filed on Oct. 1, 2012, 61/858,624, filed on Jul. 26, 2013 and 61/882,633, filed on Sep. 26, 2013, the contents of which are all hereby incorporated by reference herein in their entirety.

TECHNICAL FIELD

The present invention relates to a wireless communication system and more particularly, to a method and apparatus for replacing and recalling/canceling a Machine Type Communication (MTC) device trigger and small data.

BACKGROUND ART

MTC refers to a communication scheme involving one or more machines. MTC is also called Machine-to-Machine (M2M) communication or Internet of Things (IoT). A machine is an entity that does not need direct human manipulation or intervention. For example, a user device such as a smartphone that can be automatically connected to a network and perform communication without a user's manipulation/intervention as well as a meter or automatic vending machine equipped with a mobile communication module may be an example of the machine. Such various exemplary machines will be referred to as MTC devices or User Equipments (UEs) in the present disclosure. That is, MTC means communication performed by one or more machines (i.e., MTC devices without human manipulation/intervention.

MTC may cover communication between MTC devices (e.g., Device-to-Device (D2D) communication) and communication between an MTC device and an MTC application server. For example, communication between an MTC device and an MTC application server may be communication between an automatic vending machine and a server, communication between a Point Of Sale (POS) device and a server, and communication between an electricity, gas, or water meter and a server. Besides, MTC-based applications may include security, transportation, health care, etc.

DISCLOSURE

Technical Problem

An object of the present invention devised to solve the conventional problem is to provide a method for replacing/recalling a trigger/small data.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for replacing/recalling a device trigger by a Short Message Service-Service Center (SMS-SC) in a wireless communication system includes receiving a first message including an old trigger reference number from a Machine Type Communication-InterWorking Function (MTC-IWF), and deleting a trigger message corresponding to the old trigger reference number. If the first message further includes a new trigger reference number, the SMS-SC stores a new trigger message corresponding to the new trigger reference number along with the deletion of the trigger message.

The above technical aspect of the present invention may include all or part of the followings.

The first message may be based on a second message related to a device trigger that the MTC-IWF has received from a Services Capability Server (SCS).

The second message related to the device trigger may request one of trigger replacement and trigger recalling.

Only if the second message requests trigger replacement, the first message may include the new trigger reference number.

If the second message requests trigger recalling, the first message may not include the new trigger reference number.

If the SCS exceeds a quota or rate of trigger submission to a Tsp interface, the second message may be rejected by the MTC-IWF.

The MTC-IWF may select the SMS-SC as an SMS-SC to receive the first message from among a plurality of SMS-SCs based on configuration information.

In another aspect of the present invention, a method for replacing/recalling small data by an MTC-IWF in a wireless communication system includes identifying small data to be replaced/recalled based on an old small data reference number included in a first message, and deleting the identified small data. If the first message is related to small data replacement, the MTC-IWF stores new small data along with the deletion of the small data.

The above technical aspect of the present invention may include all or part of the followings.

The method may further include receiving the first message from an SCS.

The first message may request one of small data replacement and small data recalling.

Only if the first message requests small data replacement, the first message may include a new small data reference number.

If the SCS exceeds a quota or rate of trigger submission to a Tsp interface, the first message may be rejected by the MTC-IWF.

If the identified small data is pending in the MTC-IWF or delivery of the identified small data to a User Equipment (UE) has been failed, the identified small data may be deleted.

If the identified small data has been delivered successfully to a UE, the replacement/recalling of the small data may be considered to be failed.

The small data may be a device trigger message.

Advantageous Effects

According to the present invention, since a device trigger/small data can be replaced/recalled, network resource consumption caused by unnecessary triggering can be prevented. Network resources include resources used for signaling and data exchange and resources used to store a trigger/small data in a network until the trigger/small data is successfully transmitter.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE INVENTION

Figure 1:
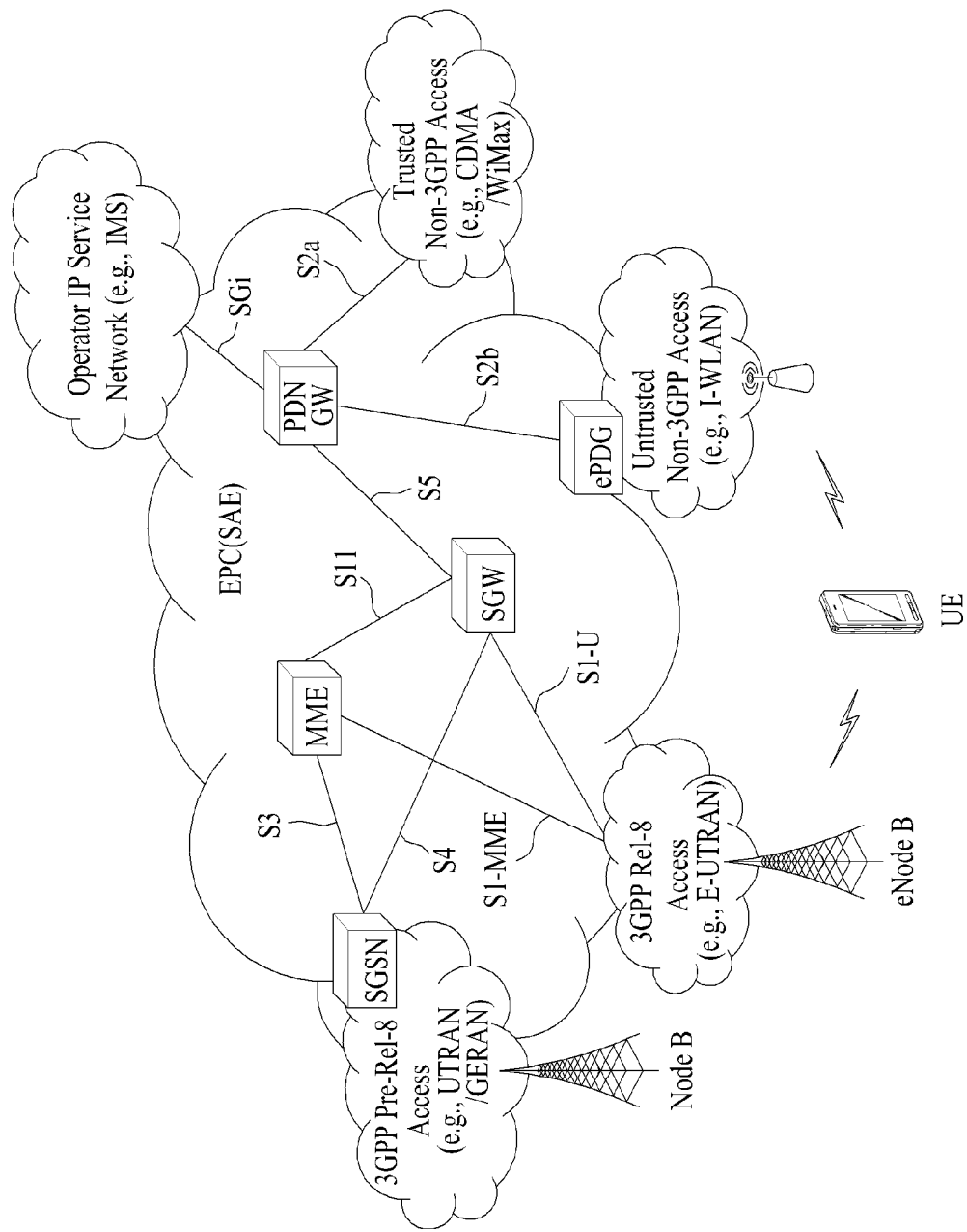
FIG. 1 illustrates an overall structure of an Evolved Packet Core (EPC)

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

Specific terms used for the embodiments of the present invention are provided to help the understanding of the present invention. These specific terms may be replaced with other terms within the scope and spirit of the present invention.

In some instances, to prevent the concept of the present invention from being ambiguous, structures and apparatuses of the known art will be omitted, or will be shown in the form of block diagram based on main functions of each structure and apparatus. Also, wherever possible, like reference numerals denote the same parts throughout the drawings and the specification.

The embodiments of the present invention can be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention can be supported by those specifications. Further, all terms as set forth herein can be explained by the standard specifications.

Techniques described herein can be used in various wireless access systems. For clarity, the present disclosure focuses on the 3GPP LTE and LTE-A systems. However, the technical features of the present invention are not limited thereto.

Terms used in the following description are defined as follows.

UMTS (Universal Mobile Telecommunication System): $3^{rd}$ generation mobile communication technology based on a Global System for Mobile Communication (GSM) developed by 3GPP.

EPS (Evolved Packet System): Network system including an Evolved Packet Core (EPC) which is a Packet Switched (PS) core network based on Internet Protocol (IP) and an access network such as LTE/UMTS Terrestrial Radio Access Network (UTRAN), which is evolved from UMTS.

NodeB: Base station of a UMTS network, which is installed outdoors and has a coverage corresponding to a macro cell.

eNB (eNodeB): Base station of an EPS network, which is installed outdoors and has a coverage corresponding to a macro cell.

UE (User equipment): UE can also be referred to as a terminal, a Mobile Equipment (ME), a Mobile Station (MS) or the like. In addition, the UE can be a portable device such as a laptop computer, a mobile phone, a Personal Digital Assistant (PDA), a smartphone or a multimedia device, or a non-portable device such as a Personal Computer (PC) or a vehicle-mounted device. The term "UE", as used in relation to MTC, can refer to an MTC UE.

IMS (IP Multimedia Subsystem): Subsystem for providing multimedia services based on IP.

IMSI (International Mobile Subscriber Identity): Globally unique user identifier assigned in a mobile communication network.

MTC (Machine Type Communication): Communication performed by a machine(s) without user intervention. MTC can also be referred to as Machine-to-Machine (M2M) communication.

MTC UE (or MTC device): UE (e.g., vending machine or meter) which has a communication function through a mobile communication network and serves a specific purpose.

MTC server: Server for managing MTC UEs on a network. The MTC server can be located inside or outside a mobile communication network, and can have an interface accessible by an MTC user. In addition, the MTC server can provide MTC-related services to other servers (e.g., Service Capability Server (SCS)), and can serve as an MTC application server.

MTC application: Service to which MTC is applied (e.g., remote metering, product movement tracking or meteorological sensing).

MTC application server: Server for executing an MTC application on a network.

MTC feature: Function of a network for supporting an MTC application. For example, MTC monitoring is a feature for preparing for equipment loss in an MTC application such as remote metering, and low mobility is a feature for an MTC application for an MTC UE such as a vending machine.

MTC subscriber: Entity connected to a network operator to provide services to one or more MTC UEs.

MTC group: Group of MTC UEs sharing one or more MTC features and belonging to an MTC subscriber.

SCS (Service Capability Server): Entity connected to a 3GPP network for communication with MTC UEs using an MTC-InterWorking Function (IWF) on a Home Public Land Mobile Network (HPLMN).

External Identifier: Globally unique identifier used to indicate (or identify) an MTC UE (or a subscriber to which the MTC UE belongs) by an external entity (e.g., SCS or Application Server) of the 3GPP network. The external identifier includes a domain identifier and a local identifier described below.

Domain Identifier: Identifier for identifying a domain controlled by an operator of a mobile communication network. One operator can use different domain identifiers for different services to provide access to the services.

Local Identifier: Identifier used to derive or acquire an International Mobile Subscriber Identity (IMSI). The local identifier should be unique within the application domain and is managed by an operator of a mobile communication network.

RAN (Radio Access Network): Unit including a NodeB, an eNodeB and a Radio Network Controller (RNC) for controlling the NodeB and the eNodeB in a 3GPP network, which is present between UEs and provides a connection to a core network.

HLR (Home Location Register)/HSS (Home Subscriber Server): Database having subscriber information in a 3GPP network. The HSS can perform functions such as configuration storage, identity management and user state storage.

RANAP (RAN Application Part): Interface between nodes (e.g., Mobility Management Entity (MME)/Serving GPRS (General Packet Radio Service) Support Node (SGSN)/Mobile Switching Center (MSC)) configured to control a RAN and a core network.

PLMN (Public Land Mobile Network): Network configured for the purpose of providing mobile communication services to individuals. This network can be configured per operator.

NAS (Non-Access Stratum): Functional layer for signaling and exchanging traffic messages between a UE and a core network in a UMTS protocol stack. Major functions thereof are to support UE mobility and to support a session management procedure for establishing and maintaining an IP connection between a UE and a PDN GW.

Hereinafter, a description will be given based on the above-defined terms.

FIG. 1 is a view schematically illustrating the architecture of an Evolved Packet System (EPS).

The EPC is a fundamental element of System Architecture Evolution (SAE) for improving the performance of 3GPP technologies. SAE corresponds to a study item for determining a network architecture supporting mobility between various types of networks. SAE aims to provide, for example, an optimized packet-based system which supports various radio access technologies based on IP and provides improved data transfer capabilities.

Specifically, the EPC is a core network of an IP mobile communication system for a 3GPP LTE system and may support packet-based real-time and non-real-time services. In the legacy mobile communication system (i.e., $2^{nd}$ Generation (2G) or $3^{rd}$ Generation (3G) mobile communication system), the function of a core network is implemented through two distinct sub-domains, e.g., a Circuit-Switched (CS) sub-domain for voice and a Packet-Switched (PS) sub-domain for data. In a 3GPP LTE system evolved from the 3G communication system, the CS and PS sub-domains are unified into a single IP domain. That is, in the 3GPP LTE system, a connection between UEs having IP capability can be established through an IP-based base station (e.g., evolved NodeB (eNodeB)), an EPC and an application domain (e.g., IMS). That is, the EPC is an architecture inevitably required to implement end-to-end IP services.

The EPC may include various components. FIG. 1 illustrates some of the components, e.g., Serving Gateway (SGW), Packet Data Network Gateway (PDN GW), Mobility Management Entity (MME), Serving GPRS (General Packet Radio Service) Supporting Node (SGSN) and enhanced Packet Data Gateway (ePDG).

The SGW operates as a boundary point between a Radio Access Network (RAN) and a core network and is an element functioning to maintain a data path between an eNodeB and a PDN GW. In addition, if a UE moves over a region served by an eNodeB, the SGW serves as a local mobility anchor point. That is, packets may be routed through the SGW for mobility in an Evolved-UMTS (Universal Mobile Telecommunications System) Terrestrial Radio Access Network (E-UTRAN) defined after 3GPP Release-8. Further, the SGW may serve as an anchor point for mobility with another 3GPP network (a RAN defined before 3GPP Release-8, e.g., UTRAN or GSM (Global System for Mobile Communication)/EDGE (Enhanced Data rates for Global Evolution) Radio Access Network (GERAN).

The PDN GW corresponds to a termination point of a data interface directed to a packet data network. The PDN GW may support policy enforcement features, packet filtering and charging support. In addition, the PDN GW may serve as an anchor point for mobility management with a 3GPP network and a non-3GPP network (e.g., untrusted network such as Interworking Wireless Local Area Network (I-WLAN) and trusted network such as Code Division Multiple Access (CDMA) network or WiMax network).

Although the SGW and the PDN GW are configured as separate gateways in the network architecture of FIG. 1, the two gateways may be implemented according to a single gateway configuration option.

The MME performs signaling and control functions for supporting access for a network connection of a UE, allocation of network resources, tracking, paging, roaming and handover. The MME controls control plane functions related to subscriber and session management. The MME manages a large number of eNodeBs and performs signaling for selection of a conventional gateway for handover to another 2G/3G network. In addition, the MME performs security procedures, terminal-to-network session handling, idle terminal location management, etc.

The SGSN handles all packet data for mobility management of a user to another 3GPP network (e.g., GPRS network) and authentication of the user.

The ePDG serves as a security node for an untrusted non-3GPP network (e.g., I-WLAN or Wi-Fi hotspot).

As described above in relation to FIG. 1, a UE having IP capabilities may access an IP service network (e.g., IMS) provided by an operator via various elements in the EPC based on not only 3GPP access but also non-3GPP access.

FIG. 1 illustrates various reference points (e.g., S1-U and S1-MME). In the 3GPP system, a conceptual link for connecting two functions, which are present in different functional entities of E-UTRAN and EPC, is defined as a reference point. Table 1 shows the reference points illustrated in FIG. 1. Various reference points other than those of Table 1 may also be present according to the network architecture.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunnelling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | Reference point between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 1, S2a and S2b correspond to non-3GPP interfaces. S2a is a reference point for providing related control and mobility support between the trusted non-3GPP access and the PDNGW to a user plane. S2b is a reference point for providing related control and mobility support between the ePDG and the PDN GW to the user plane.

Figure 2:
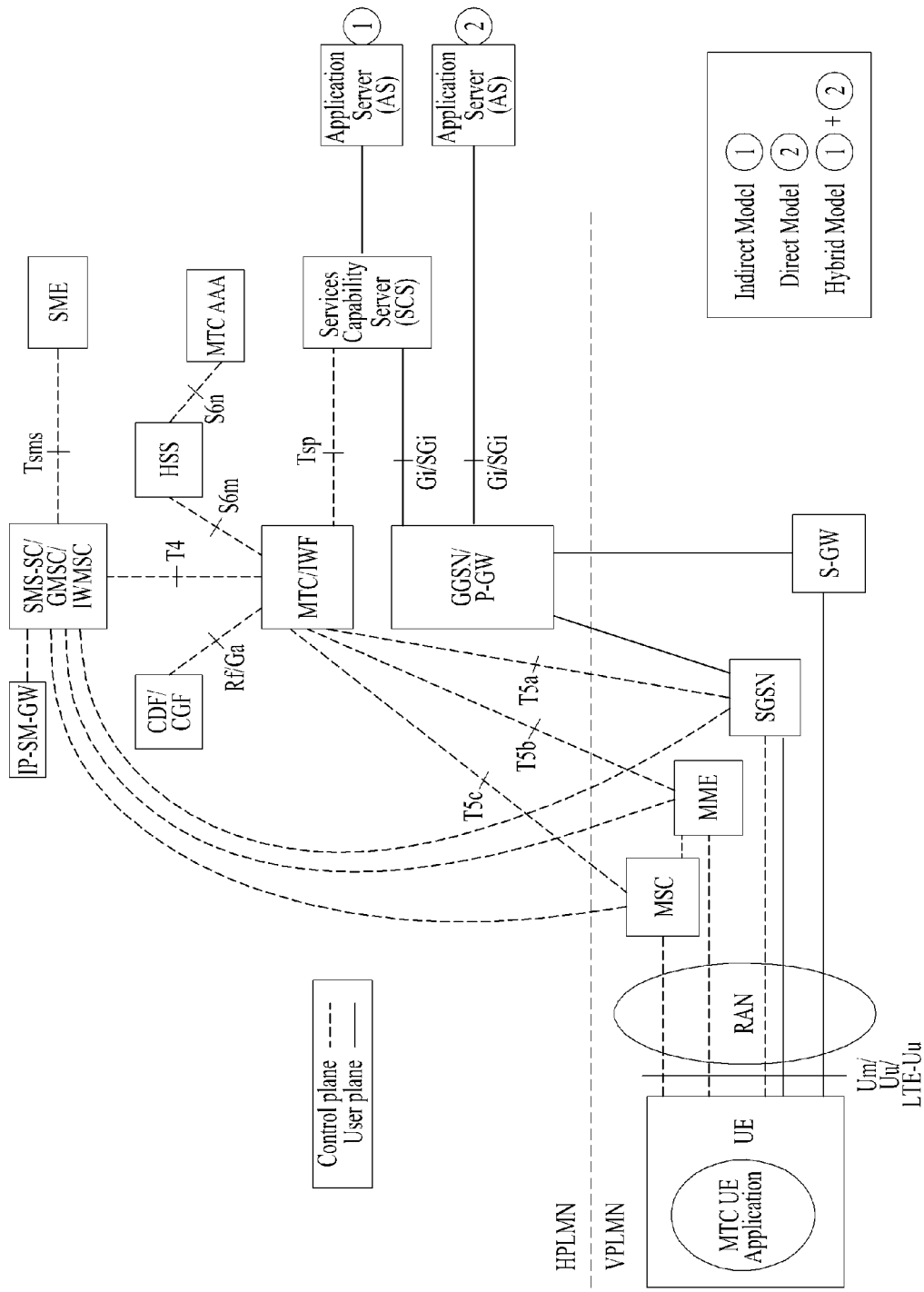
FIG. 2 illustrates an exemplary model of a Machine Type Communication (MTC) architecture.

FIG. 2 is a view illustrating an exemplary model of an MTC architecture.

An end-to-end application between a UE (or an MTC UE) used for MTC and an MTC application may use services provided by a 3GPP system and selective services provided by an MTC server. The 3GPP system may provide transport and communication services (including 3GPP bearer service, IMS and SMS) including a variety of optimization services for facilitating MTC. In FIG. 2, the UE used for MTC is connected to a 3GPP network (e.g., UTRAN, E-UTRAN, GERAN or I-WLAN) through a Um/Uu/LTE-Uu interface. The architecture of FIG. 2 includes various MTC models (e.g., direct model, indirect model and hybrid model).

A description is now given of entities illustrated in FIG. 2.

In FIG. 2, an application server is a server for executing an MTC application on a network. The above-described various technologies for implementing MTC applications are applicable to an MTC application server and a detailed description thereof is omitted here. In addition, the MTC application server may access an MTC server through a reference point API and a detailed description thereof is omitted here. Alternatively, the MTC application server may be co-located with the MTC server.

An MTC server (e.g., SCS server in FIG. 2) is a server for managing MTC UEs on a network and may be connected to the 3GPP network to communicate with the UE used for MTC and nodes of PLMN.

An MTC-InterWorking Function (IWF) may control interworking between an MTC server and a core network of an operator and serve as a proxy for MTC operation. To support an MTC indirect or hybrid model, one or more MTC-IWFs may be present within a Home PLMN (HPLMN). The MTC-IWF may relay and analyze a signaling protocol on a reference point Tsp to operate a specific function in the PLMN. The MTC-IWF may perform a function for authenticating the MTC server before the MTC server establishes communication with the 3GPP network, a function for authenticating a control plane request from the MTC server, various functions related to trigger instructions to be described below, etc.

A Short Message Service-Service Center (SMS-SC)/Internet Protocol Short Message GateWay (IP-SM-GW) may manage transmission and reception of an SMS. The SMS-SC may serve to relay a short message between a Short Message Entity (SME) (i.e., an entity for transmitting or receiving a short message) and a mobile station and to store and deliver the short message. The IP-SM-GW may serve to perform protocol interworking between the UE and the SMS-SC based on IP.

A Charging Data Function (CDF)/Charging Gateway Function (CGF) may perform operations related to charging.

An HLR/HSS may serve to store and provide subscriber information (e.g., IMSI), routing information, configuration information, etc. to the MTC-IWF.

An MSC/SGSN/MME may perform control functions such as mobility management, authentication and resource allocation for a network connection of a UE. The MSC/SGSN/MME may receive a trigger instruction from the MTC-IWF in relation to triggering to be described below, and process the trigger instruction into the form of a message to be provided to the MTC UE.

A Gateway GPRS Support Node (GGSN)/Serving-Gateway (S-GW)+Packet Data Network-Gateway (P-GW) may serve as a gateway for connecting a core network and an external network.

Table 2 shows major reference points illustrated in FIG. 2.

TABLE 2

| Reference Point | Description |
| --- | --- |
| Tsms | It is the reference point an entity outside the 3GPP system uses to communicate with UEs used for MTC via SMS. |
| Tsp | It is the reference point an entity outside the 3GPP system uses to communicate with the MTC-IWF related control plane signalling. |
| T4 | Reference point used by MTC-IWF to route device trigger to the SMS-SC in the HPLMN. |
| T5a | Reference point used between MTC-IWF and serving SGSN. |
| T5b | Reference point used between MTC-IWF and serving MME. |
| T5c | Reference point used between MTC-IWF and serving MSC. |
| S6m | Reference point used by MTC-IWF to interrogate HSS/HLR for E.164 MSISDN or external identifier mapping to IMSI and gather UE reachability and configuration information. |

One or more reference points among T5a, T5b and T5c are referred to as T5.

User plane communication with an MTC server in case of the indirect and hybrid models, and communication with an MTC application server in case of the direct and hybrid models may be performed using a legacy protocol through reference points Gi and SGi.

The descriptions given above in relation to FIG. 2 can be incorporated by reference in this specification by referring to 3GPP TS 23.682.

In the case of MTC, more MTC UEs than normal UEs are expected to be present on a network. Accordingly, MTC is required to minimize use of network resources, signaling and power.

In addition, an MTC UE may not establish an IP connection to an MTC application server at ordinary times to minimize use of system resources. If the MTC UE does not establish an IP connection and thus the MTC application server fails to transmit data to the MTC UE, the MTC UE may be requested or instructed to establish an IP connection and this request or instruction is referred to as a trigger instruction. That is, triggering of the MTC UE is required if an IP address of the MTC UE is unavailable or unreachable by the MTC application server (a fact that a certain entity or an address of the entity is unreachable means that an attempt for message delivery fails because, for example, the entity is absent from the address). To this end, the MTC UE may receive a trigger instruction from the network. Upon receiving the trigger instruction, the MTC UE is required to perform operation of an MTC application embedded therein and/or to establish communication with the MTC application server. Here, when the MTC UE receives the trigger instruction, a) a case in which the MTC UE is offline (i.e., not attached to the network), b) a case in which the MTC UE is online (i.e., attached to the network) but a data connection is not established, or c) a case in which the MTC UE is online (i.e., attached to the network) and a data connection is established, may be assumed.

For example, when an IP connection (or PDN connection) through which the MTC UE can receive data from the MTC application server is not established (or when the MTC UE can receive basic control signals but cannot receive user data), triggering of the MTC UE may be an operation for allowing the MTC UE to perform operation of an MTC application embedded therein and/or to request the MTC application server for an IP connection using a trigger message. In addition, the trigger message may include information for allowing the network to route a message to an appropriate MTC UE and allowing the MTC UE to route the message to an appropriate application of the MTC UE (hereinafter referred to as trigger information).

Figure 3:
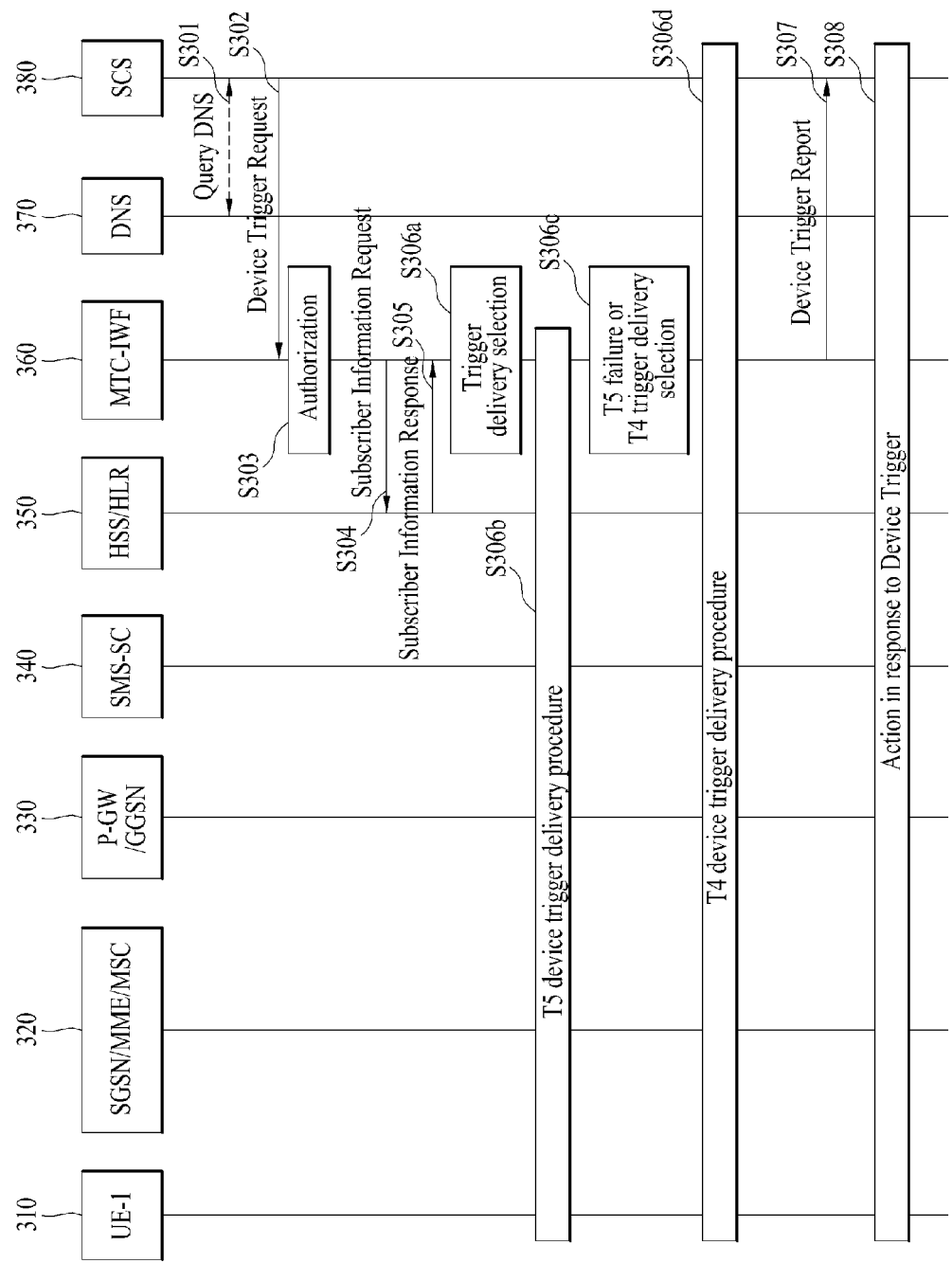
FIG. 3 is a diagram illustrating a signal flow for an MTC trigger procedure.

A detailed description is now given of an MTC trigger procedure with reference to FIG. 3.

An SCS 380 may determine to trigger an MTC UE (S301). If there is no information about an MTC-IWF to which the SCS 380 is connected for a trigger request, the SCS 380 may determine an IP address and a port number of the MTC-IWF by sending a DNS query to a DNS 370 using an external identifier of the MTC UE to be triggered or an identifier of the MTC-IWF configured in the SCS 380. After that, the SCS 380 transmits a device trigger request message to an MTC-IWF 360 (S302). The device trigger request message may include information shown in Table 3.

TABLE 3 i) External Identifier or MSISDN: Identification of MTC UE to be triggered (or subscriber to which MTC UE belongs).
ii) SCS Identifier: Identifier of SCS having transmitted the device trigger request message.

TABLE 3-continued iii) Trigger Reference Number: Reference number of the transmitted device trigger request message.
iv) Validity Period: Time period in which the device trigger request is valid. When the trigger request is not transmitted to MTC UE, the validity period indicates a period of time for which a network entity (e.g., MTC-IWF) should store the device trigger request.
v) Priority: Delivery priority of the device trigger request.
vi) Trigger Payload: Information to be transmitted to MTC application of MTC UE.

The MTC-IWF 360 having received the device trigger request message from the SCS 380 authenticates whether the SCS 380 is allowed to transmit the trigger request to a 3GPP network (S303). If authentication of the SCS 380 fails, the MTC-IWF 360 transmits a device trigger confirm message indicating failure of the device trigger request to the SCS 380. On the other hand, if authentication of the SCS 380 succeeds, the MTC-IWF 360 may perform a subsequent step.

The MTC-IWF 360 transmits a subscriber information request message to an HSS/HLR 350 (S304) in order to check whether the SCS 380 is allowed to trigger the MTC UE, to acquire IMSI using the identifier of the MTC UE (e.g., external identifier or MSISDN) which is received in step S302, and to acquire routing information including identifiers of serving nodes for serving the MTC UE.

The HSS/HLR 350 checks whether the SCS 380 having transmitted the device trigger request message is allowed to trigger the MTC UE (S305). After that, the HSS/HLR 350 transmits a subscriber information response message to the MTC-IWF 360, the message including IMSI and identifiers of serving nodes for serving the MTC UE. If the SCS 380 is not allowed to trigger the MTC UE, or if valid subscription information of the MTC UE is not present in the HSS/HLR 350, the HSS/HLR 350 transmits a subscriber information response message indicating this to the MTC-IWF 360. In this case, the MTC-IWF 360 transmits the device trigger confirm message indicating failure of the device trigger request to the SCS 380 and does not perform a subsequent step.

The MTC-IWF 360 selects a trigger delivery procedure based on the information received from the HSS/HLR 350 and local policy (S306a).

If a delivery procedure using T5 is selected, the MTC-IWF 360 performs a T5 trigger delivery procedure (S306b). A detailed description of the T5 trigger delivery procedure will be given below with reference to FIG. 4. If a delivery procedure using T4 is selected in step S306a or if T5 delivery fails in step S306b, the MTC-IWF 360 performs a T4 trigger delivery procedure (S306c and S306d). A detailed description of the T4 trigger delivery procedure will be given below with reference to FIG. 5.

The MTC-IWF 360 transmits a device trigger report message to the SCS 380 in response to the device trigger request message of S302 (S307). The device trigger report message indicates success or failure of trigger delivery to an MTC UE as a result of device trigger requested by the SCS 380.

A UE-1 310 performs an operation based on data of a trigger payload in response to the received device trigger (S308). This operation may typically include initiation of communication with the SCS 380 or an Application Server (AS).

Figure 4:
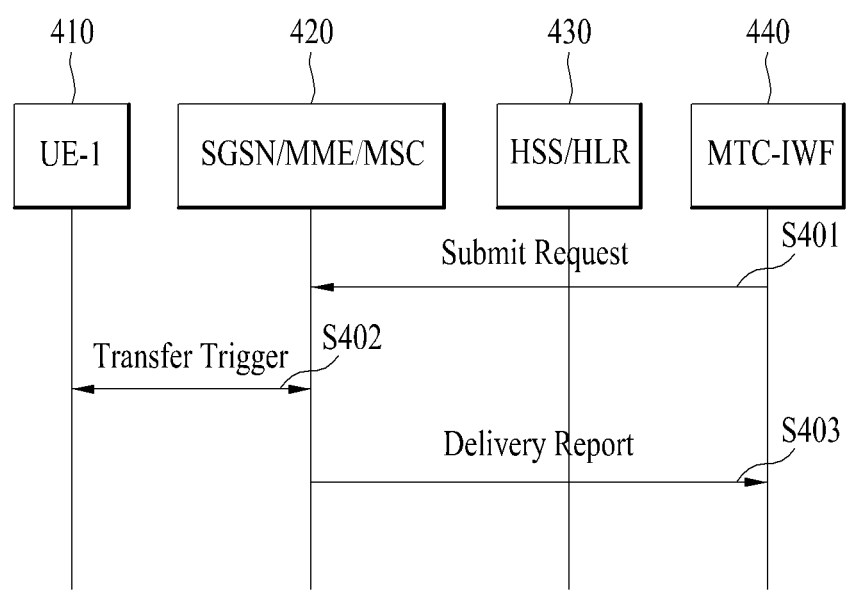
FIG. 4 is a diagram illustrating a signal flow for a T5 device trigger delivery procedure.

FIG. 4 is a view for describing a T5 trigger delivery procedure. When the MTC-IWF receives a device trigger request from the SCS in step S302 of FIG. 3, the MTC-IWF selects an appropriate trigger delivery procedure based on information received from the HSS/HLR and local policy (S304 to S306a of FIG. 3). As a result, the MTC-IWF may transmit the device trigger request to SGSN through a T5a interface, to MME through a T5b interface, or to MSC through a T5c interface (the device trigger through the T5a, T5b or T5c interface may be referred to as T5 device trigger). Alternatively, the MTC-IWF may transmit the device trigger request to SMC-SC through a T4 interface. For example, referring to FIG. 4, if a plurality of serving nodes is available based on information acquired from an HSS/HLR 430, an MTC-IWF 440 selects an appropriate serving node 420. The MTC-IWF 440 transmits a submit request message to the selected serving node 420 (S401). As described above, the MTC-IWF 440 transmits the submit request message through the T5a interface if the selected serving node is the SGSN, through the T5b interface if the selected serving node is the MME, or through the T5c interface if the selected serving node is the MSC.

The serving node 420 having received the submit request message transmits a trigger message to a UE-1 410 which is a target UE of the device trigger (S402). The serving node 420 having performed the trigger operation transmits a delivery report message to the MTC-IWF 440. The above delivery report message may indicate success or failure of trigger delivery to an MTC UE as a result of device trigger requested by the MTC-IWF 440.

Figure 5:
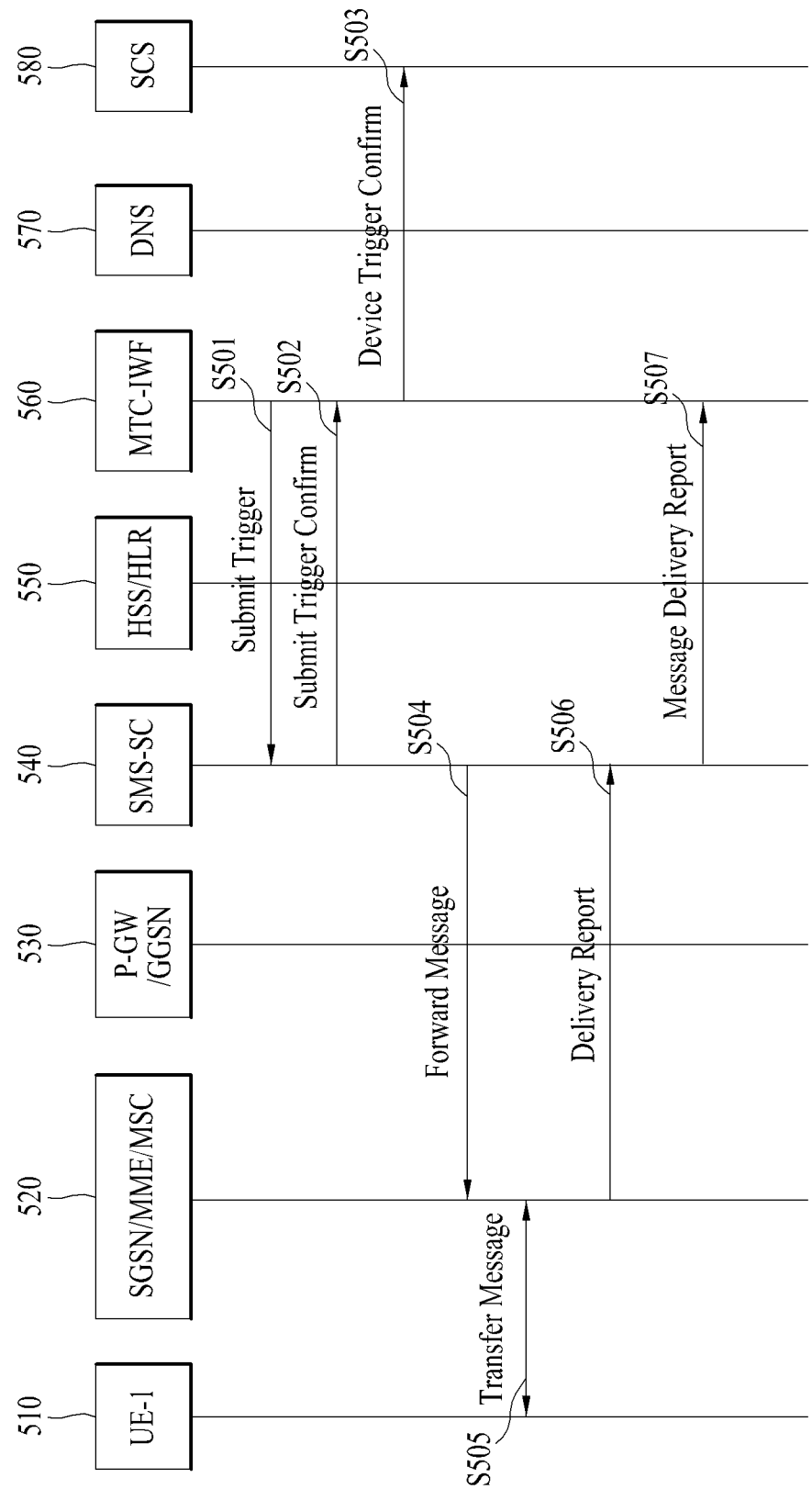
FIG. 5 is a diagram illustrating a signal flow for a T4 device trigger delivery procedure.

FIG. 5 is a diagram illustrating a signal flow for a T4 device trigger delivery procedure. Referring to FIG. 5, an MTC-IWF 560 transmits a submit trigger message to an SMS-SC 540 based on information included in a device trigger request message received from an SCS 580 and information included in a subscriber information response message received from an HSS/HLR 550 (S501). The SMS-SC 540 transmits a submit trigger confirm message indicating acceptance of the submit trigger message to the MTC-IWF 560 (S502). Upon receipt of the submit trigger confirm message from the SMS-SC 540, the MTC-IWF 560 transmits to the SCS 580 a device trigger confirm message indicating acceptance of the device trigger request message transmitted by the SCS 580 (S503).

A short message including the device trigger message transmitted by the SMS-SC 540 is forwarded to a serving node 520 (S504). If the received device trigger message includes routing information (information about the serving node), the SMS-SC 540 does not need to interrogate the HSS/HLR 550 to acquire the routing information. The SMS-SC 540 stores necessary information among the information received from the MTC-IWF 560 except the routing information in case the short message transmission is failed.

Subsequently, the serving node 520 transmits the short message to a UE-1 510 (S505). Upon receipt of the short message including the device trigger message, the UE-1 510 may respond to the serving node 520. The serving node 520 transmits a delivery report message to the SMS-SC 540 (S506). The delivery report message may indicate whether the delivery of the short message to the MTC UE is successful in response to the request for delivery of the short message made by the SMS-SC. If the delivery of the short message is failed and a validity period for the device trigger message is not set to 0, the SMS-SC 540 acquires the routing information by interrogating the HSS/HLR 550 to transmit the short message to the UE-1 510 and may then be able to perform re-transmission using the information stored in step S504. The SMS-SC 540 transmits a message delivery report message to the MTC-IWF 560 to indicate whether the trigger delivery to the MTC UE is successful in response to the device trigger requested by the MTC IWF (S507).

[Table 4] lists main information related to a device trigger message, which should be stored until before the SMS-SC indicates a transmission result (success or failure) to the MTC-IWF after the SMS-SC receives a request for transmitting a device trigger message from the MTC-IWF.

TABLE 4 i) External ID or MSISDN: an ID of an MTC UE to be triggered (or a subscriber to which the MTC UE belongs). It is used to transmit a message delivery report message to the MTC-IWF.
ii) IMSI: identification information about the MTC UE to be triggered (or the subscriber to which the MTC UE belongs).
iii) Trigger reference number or reference number: a reference number of the transmitted device trigger request message. It is used to transmit the message delivery report message to the MTC-IWF.
iv) SCS ID: an ID of a SCS transmitting the device trigger request message. It is used to transmit the message delivery report message to the MTC-IWF.
v) Trigger payload: information transmitted to an MTC application of the MTC UE.
vi) Routing information for SMS: information about a serving node to which a short message including a device trigger message is to be transmitted.
vii) Priority: device priority of the device trigger request.
viii) Validity period: a time period during which the device trigger request is valid. If a trigger is not delivered to the MTC UE, the validity period indicates a time period during which the device trigger request should be stored.
viiii) SMS application port ID: it indicates that the purpose of a short message is device triggering. It enables delivery of the short message to a triggering function within the MTC UE.

The afore-described delivery of a trigger to the MTC UE via a T4/T5 interface may be failed if the MTC UE is not available/reachable. For example, the MTC UE may be located beyond coverage, the MTC UE may not process a trigger message due to processing of another task, or there may be a lack of storage space. In this case, a network node stores the trigger message for a validity period of the trigger message and re-tries to transmit the trigger message.

In the above procedure, even though the delivery of the trigger message is not completed, the delivery of the trigger message may be excessive or unnecessary. For example, if a not-yet delivered trigger message requests a UE to transmit a measurement result of sensor A and the next trigger requests the UE to transmit measurement results of all sensors, canceling/recalling the old trigger message or replacing the old trigger message with the new trigger message may be preferred to retried delivery of the old trigger message. In other words, if the network fails to cancel/recall the not-yet delivered trigger message, the unnecessary trigger message is delivered to UEs or is stored in the network node, for delivery to the UEs, which may cause unnecessary network resource consumption. In this context, a description will be given of cancellation/recalling or replacement of a trigger message for an MTC UE. In the following description, a trigger message and small data may be replaced with each other. The small data may refer to a small amount of data or a small size of data.

Embodiment 1

Replacement or Cancellation/Recalling of T4 Trigger Message

An embodiment pertains to replacement or cancellation/recalling of a T4 trigger message.

An SMC-SC may be responsible for replacing or cancelling/recalling the T4 trigger message. Specifically, the SMC-SC may receive a first message including an old trigger reference number from an MTC-IWF and may delete a trigger message corresponding to the old trigger reference number. In the case of trigger message replacement, that is, when the first message includes a new trigger reference number, the SMC-SC may delete the trigger message corresponding to the old trigger reference number and store a trigger message corresponding to the new trigger reference number. If a UE is available, the stored new trigger message may be delivered to the UE.

As described later, the first message may be a submit trigger cancel/recall message or a submit trigger replace message. The first message may be based on a second message related to a device trigger which the MTC-IWF has received from an SCS. The second message may request one of a trigger replace operation and a trigger recall/cancel operation. Specifically, the second message may be a device trigger cancel/recall request message or a device trigger replace request message. Or the second message may be a device action request message with Action Type set to one of Cancel/Recall or Replace. Or the second message may be a device trigger request message with Request Type set to one Cancel/Recall or Replace. Like the first message, the second message may include a new trigger reference number only when it requests replacement of a device trigger and may not include the new trigger reference number when it requests cancellation/recalling of the device trigger. Further, if the SCS exceeds a quota or rate of trigger submission to a Tsp interface, the MTC-IWF may reject the second message.

If a plurality of SMS-SCs are connected to the MTC-IWF, the MTC-IWF may determine an SMS-SC to which it will transmit the first message based on a configuration. Or the MTC-IWF may determine an SMS-SC to which it will transmit the first message after acquiring information about an SMS-SC storing the old trigger message (e.g., an SMS-SC to which the MTC-IWF has requested transmission of the old trigger message) (from another network node).

Now, the cases of replacement of a trigger message and cancellation/recalling of a trigger message will be described separately in detail.

Embodiment 1a

Replacement of T4 Trigger Message

Figure 6:
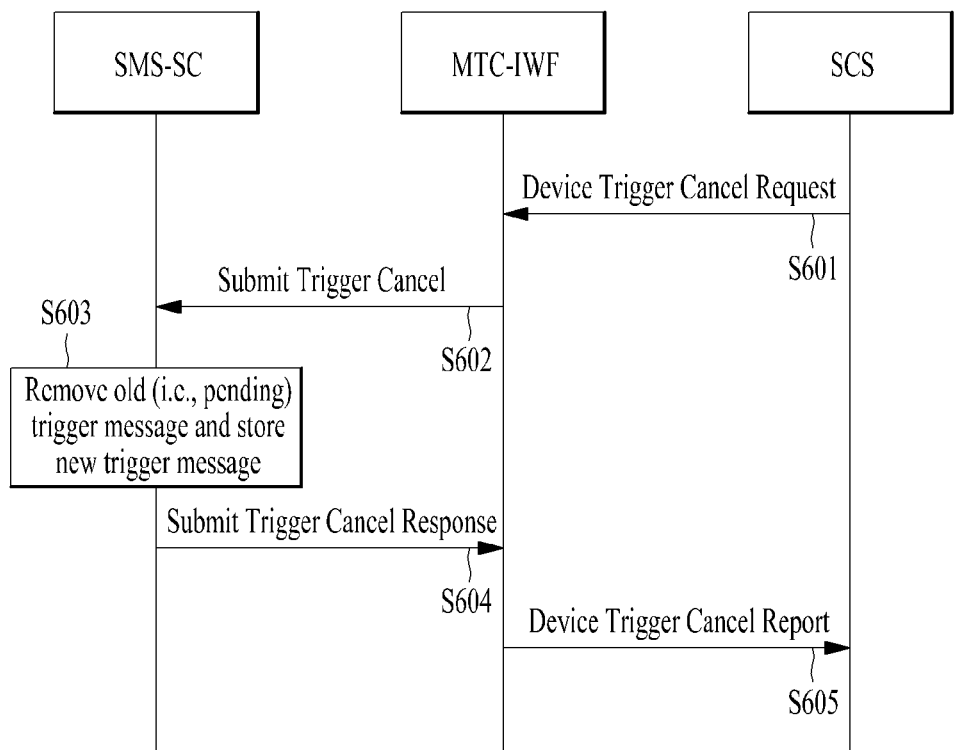
FIGS. 6 and 7 are diagrams illustrating signal flows for T4 trigger replacing/recalling methods.

FIG. 6 is a diagram illustrating a signal flow for a procedure for replacing a T4 trigger message. Referring to FIG. 6, an SCS may determine whether there is a need for cancelling/recalling and/or replacing an previously submitted trigger message in step S601. The SCS may transmit a device trigger cancel request message (including an external ID or MSISDN, an SCS ID, an old trigger reference number, a new trigger reference number, a validity period, priority, and trigger payload) to an MTC-IWF. The old trigger reference number may indicate a trigger reference number allocated to the previously submitted trigger message that the SCS wants to cancel. The new trigger reference number may be allocated to a new submitted trigger message by the SCS. While the validity period, the priority, and the trigger payload are for the new trigger message, the external ID, the MSISDN, and the SCS ID are all related to both the old trigger message (e.g., a pending trigger message) and the new trigger message.

The device trigger cancel/recall request message may be a newly defined message or a device trigger request message used for a legacy device triggering procedure over Tsp (for details, refer to 5.2.1 of TS 23.682v11.2.0). In addition, the message may include explicit or implicit information requesting replacement of an old pending trigger message with a new trigger message.

For example, a device trigger cancel/recall request message requesting replacement of a pending trigger message with a new trigger message may be configured by defining a new action type value, for example, Action-Type="Replace" (specifically, a specific enumerated value or integer value indicating "Replace") in a legacy device trigger request message, that is, a Device-Action-Request message/command. A legacy AVP may be extended or a new AVP may be defined, in order to include information required to request replacement. In another example, a new message/command requesting cancellation/recalling and/or replacement of a pending trigger message including an Action-Type AVP defined for each of recalling and replacement is defined. Or a message/command requesting cancellation/recalling of a pending trigger message and a message/command requesting replacement of a pending trigger message may be defined separately. The contents of the afore-described device trigger cancel/recall and/or replace request message that the SCS transmits to the MTC-IWF may also be applied to Embodiment 2 and Embodiment 3.

The SCS may set the new trigger reference number to the same value as the old trigger reference number. In this case, the device trigger cancel/recall request message may include both of the old and new trigger reference numbers or only one trigger reference number.

In regard to priority information, if the pending trigger message and the new trigger message have different priority values (or even though they have the same priority value), the priority value of the pending trigger message may be additionally included in the device trigger cancel/recall request message. The priority value of the pending trigger message may indicate whether the pending trigger message is to be canceled with priority. However, whether the pending trigger message is to be canceled with priority (or urgency) may be indicated by various messages and/or parameters and/or information.

In step S602, the MTC-IWF may identify which trigger message should be removed/cancelled based on at least one of the external ID, the MSISDN, the SCS ID, and the old trigger reference number included in the received device trigger cancel request message during replacement of the old trigger message with the new trigger message. Further, the MTC-IWF may transmit to the SMS-SC a submit trigger cancel message including the external ID, the MSISDN, the IMSI, the SCS ID, the old trigger reference number, the new trigger reference number, the validity period, the priority, an SMS application port ID, and the trigger payload.

If the SCS exceeds a quota or rate of trigger submission to a Tsp interface, the MTC-IWF may determine whether to accept (or reject) the device trigger cancel/recall request message based on at least one of the followings.

An operator policy and/or subscriber information.

Priority (or urgency) of canceling a pending trigger message.

Priority (or urgency) of a new trigger message.

Overload state of a Tsp interface

Overload state of a T4 interface and/or overload state of a T5 interface.

Device trigger-related information stored in the MTC-IWF and device trigger-related information acquired from another node (e.g., an HSS).

The MTC-IWF may manage a quota or rate of trigger cancellation, allowed for the SCS, separately from a quota or rate of trigger submission, allowed for the SCS. In this case, if the SCS exceeds the quota or rate of trigger cancellation, the MTC-IWF may not accept (or reject) the device trigger cancel/recall request message received from the SCS.

If the Tsp interface to the SCS is in an overload state, the MTC-IWF may determine whether to accept (or reject) the device trigger cancel/recall request message based on at least one of the followings.

An operator policy and/or subscriber information.

Priority (or urgency) of canceling a pending trigger message.

Priority (or urgency) of a new trigger message.

Overload state of a Tsp interface

Overload state of a T4 interface and/or overload state of a T5 interface.

Whether the SCS exceeds the quota or rate of trigger submission (or trigger cancellation) to the Tsp interface.

Device trigger-related information stored in the MTC-IWF and device trigger-related information acquired from another node (e.g., an HSS).

Under circumstances, only a request for cancelling a pending trigger message made by the device trigger cancel/recall request message may be accepted (or rejected), whereas a request for submitting a new trigger message may be rejected. For example, in the case where the SCS exceeds the quota or rate of trigger submission (or trigger cancellation) to the Tsp interface and/or the Tsp interface and/or the T4 interface is in an overload state, if the new trigger message does not have priority and only the pending trigger message has priority, the MTC-IWF may accept (or reject) only the request for canceling the pending trigger message, while rejecting the request for submitting the new trigger message. Or when the SCS transmits a device trigger cancel/recall request message to the MTC-IWF, the SCS may include explicit/implicit information requesting cancellation of a pending trigger message in spite of rejection of a request for submitting a new trigger message in the device trigger cancel/recall request message. On the other hand, when the SCS transmits a device trigger cancel/recall request message to the MTC-IWF, the SCS may prevent separate implementations of two operations by including explicit/implicit information requesting rejection of a request for cancelling a pending trigger message if a request for submitting a new trigger message is rejected.

The submit trigger cancel message may be a newly defined message or a submit trigger message or device trigger request message/command used for legacy trigger delivery using T4 (see 5.2.2 of TS 23.682v11.20). The message may further include explicit/implicit information requesting replacement of an old pending trigger message with a new trigger message. If the SCS includes only one trigger reference number instead of both of the old and new trigger reference numbers in the device trigger cancel/recall request message, the MTC-IWF may include only the one trigger reference number or both of the old and new trigger reference numbers set to the trigger reference number received from the SCS in the submit trigger cancel message.

Before performing step S602, the MTC-IWF may transmit to an HSS/HLR (not shown in FIG. 6) a message requesting subscriber information and/or requesting the HSS/HLR to check/authenticate whether the SCS is allowed to 'cancel/recall and replace' or 'replace' a device trigger. The request message may include explicit or implicit information indicating that the request is related to the request for cancelling/recalling and/or replacing a device trigger, received from the SCS. Upon receipt of the request, the HSS/HLR checks/authenticates whether the SCS is allowed to cancel/recall and/or replace a device trigger for an MTC UE. The SCS transmits a response message to the MTC-IWF. The response message may include subscriber information (e.g., routing information including an IMSI and an ID of a serving node serving the MTC UE). If the SCS is not allowed to cancel/recall and/or replace a device trigger for the MTC UE as a result of the check/authentication or if the HSS/HLR does not have valid subscription information about the MTC UE, the HSS/HLR transmits a response message to this effect to the MTC-IWF. In this case, the MTC-IWF transmits a message indicating failure of the device trigger cancel/recall and/or replace request to the SCS and does not perform the subsequent steps. The afore-described interaction between the MTC-IWF and the HSS/HLR may also be applied to Embodiment 2 and Embodiment 3. The step of interaction between the MTC-IWF and the HSS/HLR may be performed only when the SCS does not include an MSISDN as the ID of the MTC UE or includes only an external ID as the ID of the MTC UE in the device trigger cancel request message transmitted to the MTC-IWF in step S601.

In step S603, the SMS-SC may remove/delete the stored old trigger message identified by the old trigger reference number (the old trigger message may be pending) and/or information related to the old trigger message. The SMS-SC may store the new trigger message to be delivered to the UE when the UE is available and/or information related to the new trigger message. The trigger message and/or the information about the trigger message may be the afore-described information listed in [Table 4].

In step S604, the SMS-SC may transmit to the MTC-IWF a submit trigger cancel response message indicating successful replacement of the pending trigger message (pending in the SMS-SC) with the new trigger message.

The submit trigger cancel response message may be a newly defined message or a submit trigger confirm message or message delivery report message used for legacy trigger delivery using T4 (see 5.2.2. of TS 23.682v11.2.0). The message may further include explicit/implicit information indicating that this message is a response message to a message requesting replacement of an old pending trigger message with a new trigger message.

The MTC-IWF may transmit to the SCS a device trigger cancel report message including the external ID, the MSISDN, the old trigger reference number, and the new trigger reference number (together with a cause value indicating whether the trigger cancellation is success or failure and, if the trigger cancellation is failure, indicating the cause of the failure) in step S605.

The device trigger cancel report message may be a newly defined message according to the present invention or a device trigger report message or Device-Notification-Request (DNR) message/command used for legacy device triggering over Tsp (see 5.2.1 of TS 23.682v11.2.0). The message may further include explicit/implicit information indicating that this message is a response message to a message requesting replacement of an old pending trigger message with a new trigger message.

Embodiment 1b

Cancellation/Recalling of T4 Trigger Message

Figure 7:
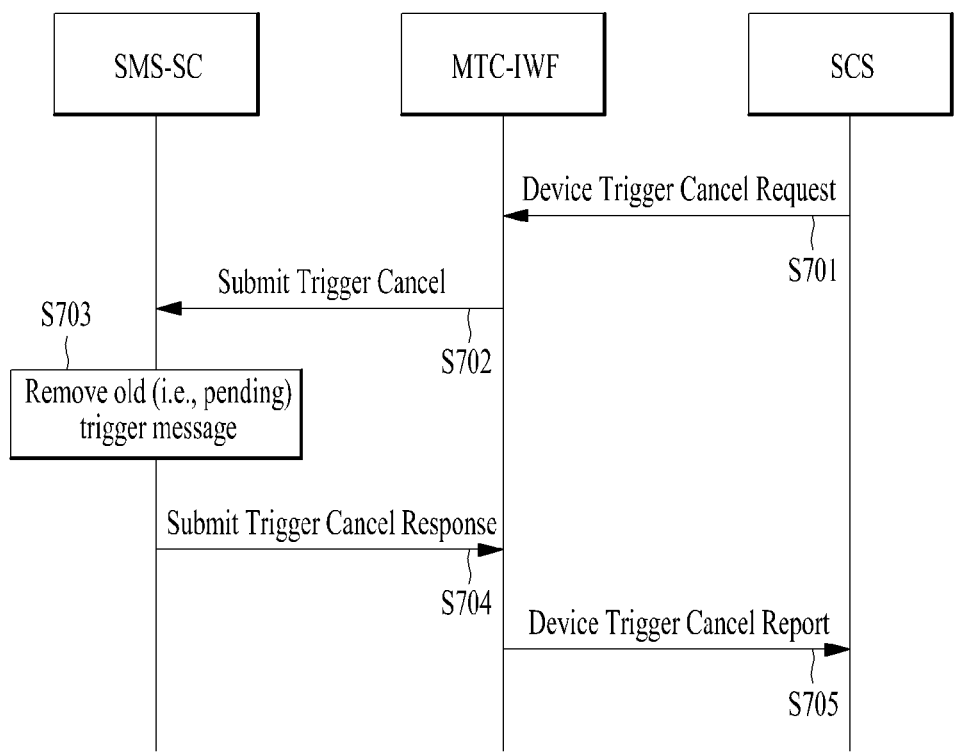

Referring to FIG. 7, an SCS may determine whether there is a need for cancelling an previously submitted trigger message in step S701. The SCS may transmit a device trigger cancel request message (including an external ID or MSISDN, an SCS ID, and an old trigger reference number or a trigger reference number) to an MTC-IWF. The old trigger reference number may indicate a trigger reference number allocated to the previously submitted trigger message that the SCS wants to cancel.

The device trigger cancel/recall request message may be a newly defined message according to the present invention or a device trigger request message used for the legacy device triggering procedure over Tsp (for details, refer to 5.2.1 of TS 23.682v11.2.0). In addition, the message may further include explicit/implicit information requesting cancellation of an old pending trigger message.

For example, the device trigger cancel/recall request message requesting cancellation of a pending trigger message may be configured by defining a new action type value, for example, Action-Type="Recall" (specifically, a specific enumerated value or integer value indicating "Recall") in a legacy device trigger request message, that is, a Device-Action-Request message/command (described in 2.2.3). A legacy AVP may be extended or a new AVP may be defined, in order to include information required to request recalling. In another example, a new message/command requesting recalling or replacement of a pending trigger message is defined and an Action-Type AVP defined for each of recalling and replacement is included in the new message/command. Or a message/command requesting cancellation/recalling of a pending trigger message and a message/command requesting replacement of a pending trigger message may be defined separately. The afore-described contents of the device trigger cancel/recall request message that the SCS transmits to the MTC-IWF may also be applied to Embodiment 2 and Embodiment 3.

A priority value of the pending trigger message may be additionally included in the device trigger cancel/recall request message. The priority value of the pending trigger message may indicate whether there is priority for canceling the pending trigger message. However, whether the pending trigger message is to be canceled with priority (or urgency) may be indicated by various messages and/or parameters and/or information.

In step S702, the MTC-IWF may identify which trigger message should be removed/cancelled based on at least one of the external ID, the MSISDN, the SCS ID, and the old trigger reference number included in the received device trigger cancel request message. Further, the MTC-IWF may transmit to an SMS-SC a submit trigger cancel message including the external ID, the MSISDN, an IMSI, the SCS ID, and the old trigger reference number (or the trigger reference number).

If the SCS exceeds a quota or rate of trigger submission to a Tsp interface, the MTC-IWF may determine whether to accept (or reject) the device trigger cancel/recall request message based on at least one of the followings.

An operator policy and/or subscriber information.
Priority (or urgency) of canceling a pending trigger message.
Overload state of a Tsp interface
Overload state of a T4 interface and/or overload state of a T5 interface.
Device trigger-related information stored in the MTC-IWF and device trigger-related information acquired from another node (e.g., an HSS).

The MTC-IWF may manage a quota or rate of trigger cancellation, allowed for the SCS, separately from a quota or rate of trigger submission, allowed for the SCS. In this case, if the SCS exceeds the quota or rate of trigger cancellation, the MTC-IWF may not accept (or reject) the device trigger cancel/recall request message received from the SCS.

If the Tsp interface to the SCS is in an overload state, the MTC-IWF may determine whether to accept (or reject) the device trigger cancel/recall request message based on at least one of the followings.

An operator policy and/or subscriber information.
Priority (or urgency) of a pending trigger message.
Overload state of a Tsp interface
Overload state of a T4 interface and/or overload state of a T5 interface.
Whether the SCS exceeds the quota or rate of trigger submission (or trigger cancellation) to the Tsp interface.
Device trigger-related information stored in the MTC-IWF and device trigger-related information acquired from another node (e.g., an HSS).

The submit trigger cancel message may be a newly defined message or a submit trigger message used for the legacy trigger delivery using T4 (see 5.2.2 of TS 23.682v11.20). The message may further include explicit/implicit information requesting cancellation of an old pending trigger message.

Before performing step S702, the MTC-IWF may transmit to an HSS/HLR (not shown in FIG. 7) a message requesting subscriber information and/or requesting checking/authentication as to whether the SCS is allowed to 'cancel/recall and replace' or 'replace' a device trigger. The request message may include explicit or implicit information indicating whether the request is a request for cancelling/recalling and/or replacing a device trigger from the SCS. Upon receipt of the request, the HSS/HLR checks/authenticates whether the SCS is allowed to cancel/recall and/or replace a device trigger for an MTC UE. The SCS transmits a response message to the MTC-IWF. The response message may include subscriber information (e.g., routing information including an IMSI and an ID of a serving node serving the MTC UE). If the SCS is not allowed to cancel/recall and/or replace a device trigger for the MTC UE as a result of the check/authentication or if the HSS/HLR does not have valid subscription information about the MTC UE, the HSS/HLR transmits a response message including information to this effect to the MTC-IWF. In this case, the MTC-IWF transmits a message indicating failure of the device trigger cancel/recall and/or replace request to the SCS and does not perform the subsequent steps. The afore-described interaction between the MTC-IWF and the HSS/HLR may also be applied to Embodiment 2 and Embodiment 3. The step of interaction between the MTC-IWF and the HSS/HLR may be performed only when the SCS does not include the MSISDN as the ID of the MTC UE or includes only the external ID as the ID of the MTC UE in the device trigger cancel request message transmitted to the MTC-IWF in step S701.

In step S703, the SMS-SC may remove the stored old trigger message identified by the old trigger reference number (it may be pending) and/or other information (e.g., at least one of the external ID, the MSISDN, the IMSI, and the SCS ID) included in the received submit trigger cancel message. The SMS-SC may store a new trigger message to be delivered to the UE when the UE is available.

In step S704, the SMS-SC may transmit to the MTC-IWF a submit trigger cancel response message indicating successful removal/recalling of the pending trigger message (pending in the SMS-SC) to the new trigger message.

The submit trigger cancel response message may be a newly defined message according to the present invention or a submit trigger confirm message or message delivery report message used for the legacy trigger delivery using T4 (see 5.2.2. of TS 23.682v11.2.0). The message may further include explicit/implicit information indicating that this message is a response message to a message requesting cancellation of an old pending trigger message.

The MTC-IWF may transmit to the SCS a device trigger cancel report message including the external ID, the MSISDN, and the old trigger reference number (together with a cause value indicating whether the trigger cancellation is success or failure and, if the trigger cancellation is failure, indicating the cause of the failure) in step S705.

The device trigger cancel report message may be a newly defined message according to the present invention or a device trigger report message used for the legacy device triggering over Tsp (see 5.2.1 of TS 23.682v11.2.0). The message may further include explicit/implicit information indicating that this message is a response message to a message requesting cancellation of an old pending trigger message.

In the afore-described Embodiment 1a and/or Embodiment 1b, if a plurality of SMS-SCs are connected to the MTC-IWF, the MTC-IWF needs to select/determine an SMS-SC to which it will transmit a request message requesting cancellation/recalling of a device trigger or a request message requesting replacement of a device trigger. This is because the MTC-IWF should transmit a replace or cancel/recall request message to an SMS-SC storing an old trigger message (i.e., an SMS-SC to which the MTC-IWF has requested transmission of the old trigger message) among the plurality of SMS-SCs. The MTC-IWF may select/determine an SMS-SC in one or more of the following methods.

First, an SMS-SC transmitting a device trigger delivery request message (the submit trigger message in step S501 of FIG. 5) may have been configured on a UE basis in the MTC-IWF. This may mean that an SMS-SC receiving a first message related to replacement or cancellation/recalling of a T4 trigger message is configured for each UE. That is, the MTC-IWF may determine an SMS-SC to which it will transmit the first message based on a configuration.

For example, SMS-SC-1 is configured for UE-1 and UE-2 and SMS-SC-2 is configured for UE-3 and UE-4. Thus, a request message for replacement or cancellation/recalling of a device trigger is transmitted to a configured SMS-SC. A UE may be identified by one or more of an external ID and an MSISDN and other information may be used to determine/select an SMS-SC assigned to/configured for a specific UE.

Second, the MTC-IWF requests information about an SMS-SC storing an old trigger message on which replacement or cancellation/recalling of a device trigger should be performed (i.e., a SMS-SC to which the MTC-IWF has requested transmission of the old trigger message) to an HSS/HLR and acquires the information from the HSS/HLR.

Upon receipt of a message requesting the SMC-SC information from the MTC-IWF, the HSS/HLR provides the SMS-SC information (e.g., an address, name, and ID of an SMS-SC) to the MTC-IWF. When the MTC-IWF transmits the request message to the HSS/HLR, the MTC-IWF may include at least one of an external ID and a MSISDN and may further include an SCS ID. This is based on information included in a device trigger replace or cancel/recall request message received from an SCS. If a trigger transmission is failed, the SMS-SC requests the HSS/HLR to notify the SMS-SC when a UE is available (i.e., an Alert-Service Center mechanism) (see step 8 in 5.2.2 of TS 23.682). Whenever the HSS/HLR receives this request, it may store an SMS-SC address/SMS-SC information with respect to the UE. Thus, upon receipt of an SMS-SC information request message from the MTC-IWF, the HSS/HLR may provide SMS-SC information to the MTC-IWF. After transmitting a notification message indicating availability of a UE to an SMS-SC when the UE is available, the HSS/HLR may maintain or delete information about the SMS-SC. In the latter case, if the HSS/HLR receives a message requesting SMS-SC information from the MTC-IWF, the HSS/HLR may not store the SMS-SC information any longer. Then the HSS/HLR transmits a response (explicitly or implicitly) indicating unavailability of the SMS-SC information to the MTC-IWF. Upon receipt of the response, the MTC-IWF transmits i) a response message indicating failure of the device trigger replacement or cancellation/recalling to the SCS or ii) a response message indicating failure of the device trigger cancellation/recalling to the SCS, if the SCS has requested device trigger cancellation/recalling. If the SCS has requested device trigger replacement, the MTC-IWF transmits a new trigger message in a T4 method. Additionally, the MTC-IWF may transmit a response to the SCS. The response may include information indicating failure of cancellation/recalling of an old trigger message and/or information indicating that a new trigger message will be transmitted. Messages exchanged for the MTC-IWF to acquire SMS-SC information from the HSS/HLR may be messages exchanged to request subscriber information and/or to request check/authentication of an SCS before step S602 in Embodiment 1a and step S702 in Embodiment 1b. The message may include explicit or implicit information indicating that the MTC-IWF requests SMS-SC information.

The above-described methods for selecting/determining an SMS-SC may be applied across the present disclosure. Further, the method for selecting/determining an SMS-SC based on a configuration may be extended to T5 device trigger delivery related to later-described Embodiment 2. That is, when an SCS is connected to a plurality of MTC-IWFs, the SCS should transmit a replace or cancel/recall request message to an MTC-IWF storing an old trigger message (i.e., an MTC-IWF to which the SCS has requested transmission of the old trigger message) and the SCS may select/determine an appropriate MTC-IWF based on a configuration.

Embodiment 2

Replacement or Cancellation/Recalling of T5 Trigger Message

Another embodiment pertains to replacement or cancellation/recalling of a T5 trigger message.

An MTC-IWF may be responsible for replacing or cancelling/recalling the T5 trigger message. Specifically, the MTC-IWF may identify a trigger message to be canceled/recalled or replaced based on an old trigger reference number included in a first message and may remove the identified trigger message. If the first message is related to trigger message replacement (e.g., if the first message includes a new trigger reference number), the MTC-IWF may remove the trigger message corresponding to the old trigger reference number and store a new trigger message (corresponding to the new trigger reference number). If a UE is available, the stored new trigger message may be delivered to the UE.

As described later, the first message may be a submit trigger cancel/recall message or a submit trigger replace message. The first message may be related to a device trigger that the MTC-IWF has received from an SCS. In other words, the first message may request one of a trigger replacing operation and a trigger recalling/cancellation operation. Specifically, the first message may be a device trigger cancel/recall request message or a device trigger replace request message. Or the first message may be a device action request message with Action Type set to one of Cancel/Recall and Replace. Further, if the SCS exceeds a quota or rate of trigger submission to a Tsp interface, the MTC-IWF may reject the first message.

Embodiment 2a

Replacement of T5 Trigger Message

Figure 8:
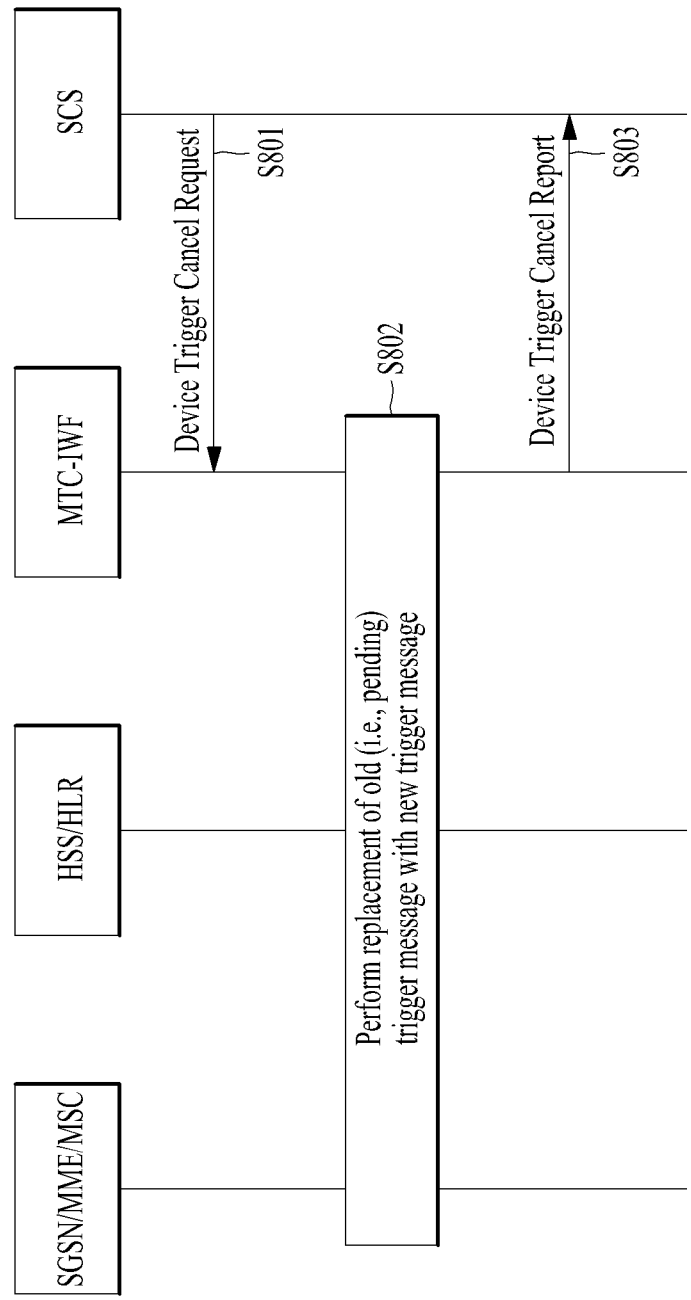
FIGS. 8 and 9 are diagrams illustrating signal flows for T5 trigger replacing/recalling methods.

FIG. 8 is a diagram illustrating a signal flow for an operation for replacing a T5 trigger message. Referring to FIG. 8, an SCS may determine whether there is a need for cancelling an previously submitted trigger message in step S801. The SCS may transmit a device trigger cancel request message (including an external ID or MSISDN, an SCS ID, an old trigger reference number, a new trigger reference number, a validity period, priority, trigger payload, etc.) to an MTC-IWF. The old trigger reference number may indicate a trigger reference number allocated to the previously submitted trigger message that the SCS wants to cancel. The new trigger reference number may be allocated to a new submitted trigger message by the SCS. While the validity period, the priority, and the trigger payload are for the new trigger message, the external ID, the MSISDN, and the SCS ID are all related to both the old trigger message (e.g., a pending trigger message) and the new trigger message.

The device trigger cancel/recall request message may be a newly defined message or a device trigger request message used for the legacy device triggering procedure over Tsp (for details, refer to 5.2.1 of TS 23.682v11.2.0). In addition, the message may include explicit or implicit information requesting replacement of an old pending trigger message with a new trigger message.

The SCS may set the new trigger reference number to the same value as the old trigger reference number. In this case, the device trigger cancel/recall request message may include both of the old and new trigger reference numbers or only one trigger reference number.

In regard to priority information, if the pending trigger message and the new trigger message have different priority values (or even though they have the same priority value), the priority value of the pending trigger message may be additionally included in the device trigger cancel/recall request message. The priority value of the pending trigger message may indicate whether there is priority for canceling the pending trigger message. However, whether the pending trigger message is to be canceled with priority (or urgency) may be indicated by various messages and/or parameters and/or information.

The MTC-IWF may identify a trigger message to be removed based on at least one of the external ID, the MSISDN, the SCS ID, and the old trigger reference number included in the received device trigger cancel request message during replacement of the old trigger message with the new trigger message.

If the SCS exceeds a quota or rate of trigger submission to a Tsp interface, the MTC-IWF may determine whether to accept (or reject) the device trigger cancel/recall request message based on at least one of the followings.

An operator policy and/or subscriber information.
Priority (or urgency) of canceling a pending trigger message.
Priority (or urgency) of a new trigger message.
Overload state of a Tsp interface
Overload state of a T5 interface and/or overload state of a T4 interface.
Device trigger-related information stored in the MTC-IWF and device trigger-related information acquired from another node (e.g., an HSS).

The MTC-IWF may manage a quota or rate of trigger cancellation, allowed for the SCS, separately from a quota or rate of trigger submission, allowed for the SCS. In this case, if the SCS exceeds the quota or rate of trigger cancellation, the MTC-IWF may not accept (or reject) the device trigger cancel/recall request message received from the SCS.

If the Tsp interface to the SCS is in an overload state, the MTC-IWF may determine whether to accept (or reject) the device trigger cancel/recall request message based on at least one of the followings.

An operator policy and/or subscriber information.
Priority (urgency) of canceling a pending trigger message.
Priority (or urgency) of a new trigger message.
Overload state of a Tsp interface
Overload state of a T5 interface and/or overload state of a T4 interface.
Whether the SCS exceeds the quota or rate for trigger submission (or trigger cancellation) to the Tsp interface.
Device trigger-related information stored in the MTC-IWF and device trigger-related information acquired from another node (e.g., an HSS).

Under circumstances, only a request for cancelling a pending trigger message made by the device trigger cancel/recall request message may be accepted (or rejected), while a request for submitting a new trigger message may be rejected. For example, in the case where the SCS exceeds the quota or rate of trigger submission (or trigger cancellation) to the Tsp interface and/or the Tsp interface and/or the T5 interface is in an overload state, if the new trigger message does not have priority and only the pending trigger message has priority, the MTC-IWF may reject the request for submitting the new trigger message, while accepting (or rejecting) only the request for canceling the pending trigger message. Or when the SCS transmits a device trigger cancel/recall request message to the MTC-IWF, the SCS may include explicit/implicit information requesting cancellation of a pending trigger message in spite of rejection of a request for submitting a new trigger message in the device trigger cancel/recall request message. On the other hand, when the SCS transmits a device trigger cancel/recall request message to the MTC-IWF, the SCS may prevent separate implementations of two operations by including explicit/implicit information requesting rejection of a request for cancelling a pending trigger message if a request for submitting a new trigger message is rejected.

In step S802, the MTC-IWF may replace the pending trigger message with the new trigger message. The replacement operation may be performed differently according to a network node that stores the pending trigger message, as follows.

If the MTC-IWF stores the pending trigger message (or performs a store & forward function), the MTC-IWF removes/deletes the pending trigger message and/or information related to the pending trigger message and stores the new trigger message and/or information related to the new trigger message. If a serving node (i.e., an MSC/SGSN/MME) stores the pending trigger message (or performs a store & forward function), the MTC-IWF may request the serving node to remove the pending trigger message and store the new trigger message by transmitting a message to the serving node (via a T5 interface or through another node). If a node other than the above nodes stores the pending trigger message (or performs a store & forward function), the MTC-IWF may request the other node to remove the pending trigger message and store the new trigger message by transmitting a message to the other node (via an interface connected to the other node or through another node).

In step S803, the MTC-IWF may transmit to the SCS a device trigger cancel report message including the external ID, the MSISDN, the old trigger reference number, and the new trigger reference number (together with a cause value indicating whether the trigger cancellation is success or failure and, if the trigger cancellation is failure, indicating the cause of the failure). The device trigger cancel report message may be a newly defined message according to the present invention or a device trigger report message or Device-Notification-Request (DNR) message/command used for the legacy device triggering over Tsp (see 5.2.1 of TS 23.682v11.2.0). The message may further include explicit/implicit information indicating that this message is a response message to a message requesting replacement of an old pending trigger message with a new trigger message.

Embodiment 2b

Cancellation/Recalling of T5 Trigger Message

Figure 9:
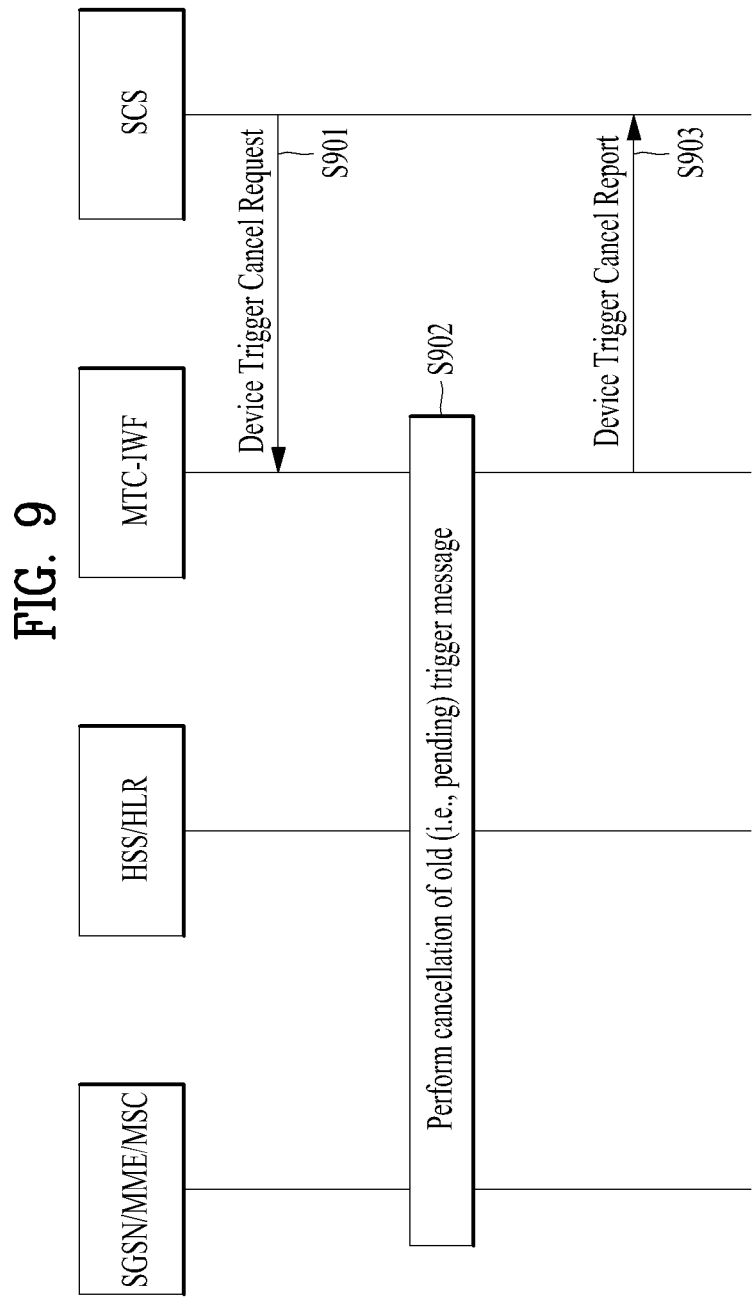
Figure 10:
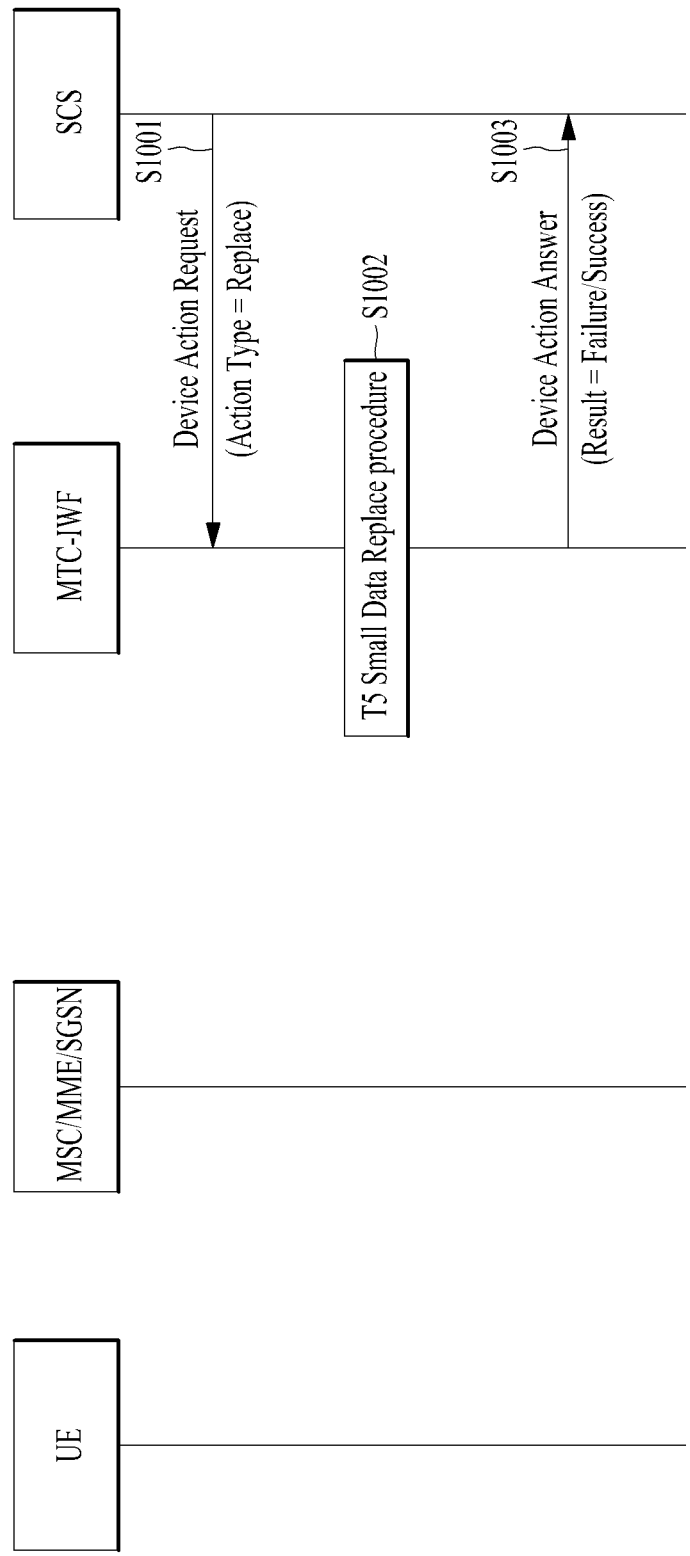
FIGS. 10 to 13 are diagrams illustrating signal flows for T5 small data replacing/recalling methods.

Referring to FIG. 9, an SCS may determine whether there is a need for cancelling an previously submitted trigger message in step S901. The SCS may transmit a device trigger cancel request message (including an external ID or MSISDN, an SCS ID, and an old trigger reference number or a trigger reference number) to an MTC-IWF. The old trigger reference number (or the trigger reference number) may indicate a trigger reference number allocated to the previously submitted trigger message that the SCS wants to cancel.

The device trigger cancel/recall request message may be a newly defined message according to the present invention or a device trigger request message used for the legacy device triggering procedure over Tsp (for details, refer to 5.2.1 of TS 23.682v11.2.0). In addition, the message may include explicit/implicit information requesting cancellation of an old pending trigger message.

A priority value of the pending trigger message may be additionally included in the device trigger cancel/recall request message. The priority value of the pending trigger message may indicate whether there is priority for canceling the pending trigger message. However, whether the pending trigger message is to be canceled with priority (or urgency) may be indicated by various messages and/or parameters and/or information.

The MTC-IWF may identify a trigger message to be removed based on at least one of the external ID, the MSISDN, the SCS ID, and the old trigger reference number included in the received device trigger cancel request message.

If the SCS exceeds a quota or rate of trigger submission to a Tsp interface, the MTC-IWF may determine whether to accept (or reject) the device trigger cancel/recall request message based on at least one of the followings.

An operator policy and/or subscriber information.
Priority (or urgency) of canceling a pending trigger message.
Overload state of a Tsp interface
Overload state of a T5 interface and/or overload state of a T4 interface.
Device trigger-related information stored in the MTC-IWF and device trigger-related information acquired from another node (e.g., an HSS).

The MTC-IWF may manage a quota or rate of trigger cancellation, allowed for the SCS, separately from a quota or rate of trigger submission, allowed for the SCS. In this case, if the SCS exceeds the quota or rate of trigger cancellation, the MTC-IWF may not accept (or reject) the device trigger cancel/recall request message received from the SCS.

If the Tsp interface to the SCS is in an overload state, the MTC-IWF may determine whether to accept (or reject) the device trigger cancel/recall request message based on at least one of the followings. The determination may be made based on various pieces of information other than the following information.

An operator policy and/or subscriber information.
Priority (or urgency) of canceling a pending trigger message.
Overload state of a Tsp interface
Overload state of a T5 interface and/or overload state of a T4 interface.
Whether the SCS exceeds the quota or rate of trigger submission (or trigger cancellation) to the Tsp interface.
Device trigger-related information stored in the MTC-IWF and device trigger-related information acquired from another node (e.g., an HSS).

In step S902, the MTC-IWF may cancel/recall the pending trigger message. The cancellation/recalling operation may be performed differently according to a network node that stores the pending trigger message, as follows.

If the MTC-IWF stores the pending trigger message (or performs a store & forward function), the MTC-IWF removes/deletes the pending trigger message. If the MTC-IWF has subscribed to a notification service of notifying availability of a UE to another node (e.g., an HSS/HLR) to know availability of a UE, the MTC-IWF may further perform an operation for releasing the notification service. If a serving node (i.e., an MSC/SGSN/MME) stores the pending trigger message (or performs a store & forward function), the MTC-IWF may request the serving node to remove/delete the pending trigger message and may receive a response to the request.

If a node other than the above nodes stores the pending trigger message (or performs a store & forward function), the MTC-IWF may request the other node to remove/delete the pending trigger message by transmitting a message to the other node (via an interface connected to the node or through another node). If the other node storing the pending trigger message has subscribed to a notification service of notifying availability of a UE to another node (e.g., an HSS/HLR) to know availability of a UE, the other node may further perform an operation for releasing the notification service.

In step S903, the MTC-IWF may transmit to the SCS a device trigger cancel report message including the external ID, the MSISDN, and the trigger reference number (together with a cause value indicating whether the trigger cancellation is success or failure and, if the trigger cancellation is failure, indicating the cause of the failure). The device trigger cancel report message may be a newly defined message according to the present invention or a device trigger report message used for the legacy device triggering over Tsp (see 5.2.1 of TS 23.682v11.2.0). The message may further include explicit/implicit information indicating that this message is a response message to a message requesting cancellation of an old pending trigger message.

Embodiment 3

Replacement or Cancellation/Recalling of T5 Small Data

A third embodiment pertains to replacement or cancellation/recalling of small data using a T5 interface.

An MTC-IWF may be responsible for replacing or cancelling/recalling small data using a T5 interface. Specifically, the MTC-IWF may identify small data to be canceled/recalled or replaced based on an old small data reference number included in a first message and remove the identified small data. If the first message is related to replacement of small data (e.g., if the first message includes a new small data reference number), the MTC-IWF may remove the small data corresponding to the old small data reference number and store new small data (corresponding to the new small data reference number). If a UE is available, the stored new small data may be delivered to the UE.

As described later, the first message may be a small data cancel/recall message or a small data replace message. The first message may be a message related to small data which the MTC-IWF has received from the SMC-SC. In other words, the first message may request one of small data replacement and small data recalling/cancellation. Specifically, the first message may be a device action request message with Action Type set to one of Cancel/Recall and Replace. Further, if the SCS exceeds a quota or rate of small data submission to a Tsp interface, the MTC-IWF may reject the first message.

Embodiment 3a

Replacement of T5 Small Data

In step S1001, an SCS may determine whether there is a need for replacing previously submitted small data. The SCS may transmit a device action request with Action Type set to Small Data Replace Request (including an external ID or MSISDN, an SCS ID, an old small data reference number, a new small data reference number, a validity period/message duration, priority, small data payload, etc.) to an MTC-IWF.

The old small data reference number may indicate a small data reference number allocated to the previously submitted small data that the SCS wants to cancel. The new small data reference number may be allocated to new submitted small data by the SCS.

For the operation for replacing the previously submitted small data, the SCS includes a reference number (or ID or indicator) of small data in a small data transmission request transmitted to the MTC-IWF.

If the SCS exceeds a quota or rate of small data submission to a Tsp interface, the MTC-IWF may reject the device trigger action request message with Action Type set to Small Data Replace Request, received from the SCS. The MTC-IWF may transmit a response message indicating rejection (together with a cause value indicating the cause of the failure) to the SCS and may not perform the subsequent steps.

In step S1002, the MTC-IWF performs a small data replacement procedure over the T5 interface. This will be described later in detail with reference to FIG. 11.

In step S1003, the MTC-IWF may indicate success or failure of small data replacement in a device action response message to the SCS. In other words, the MTC-IWF transmits a response message to the small data replace request or a message indicating the result to the SCS.

Figure 11:
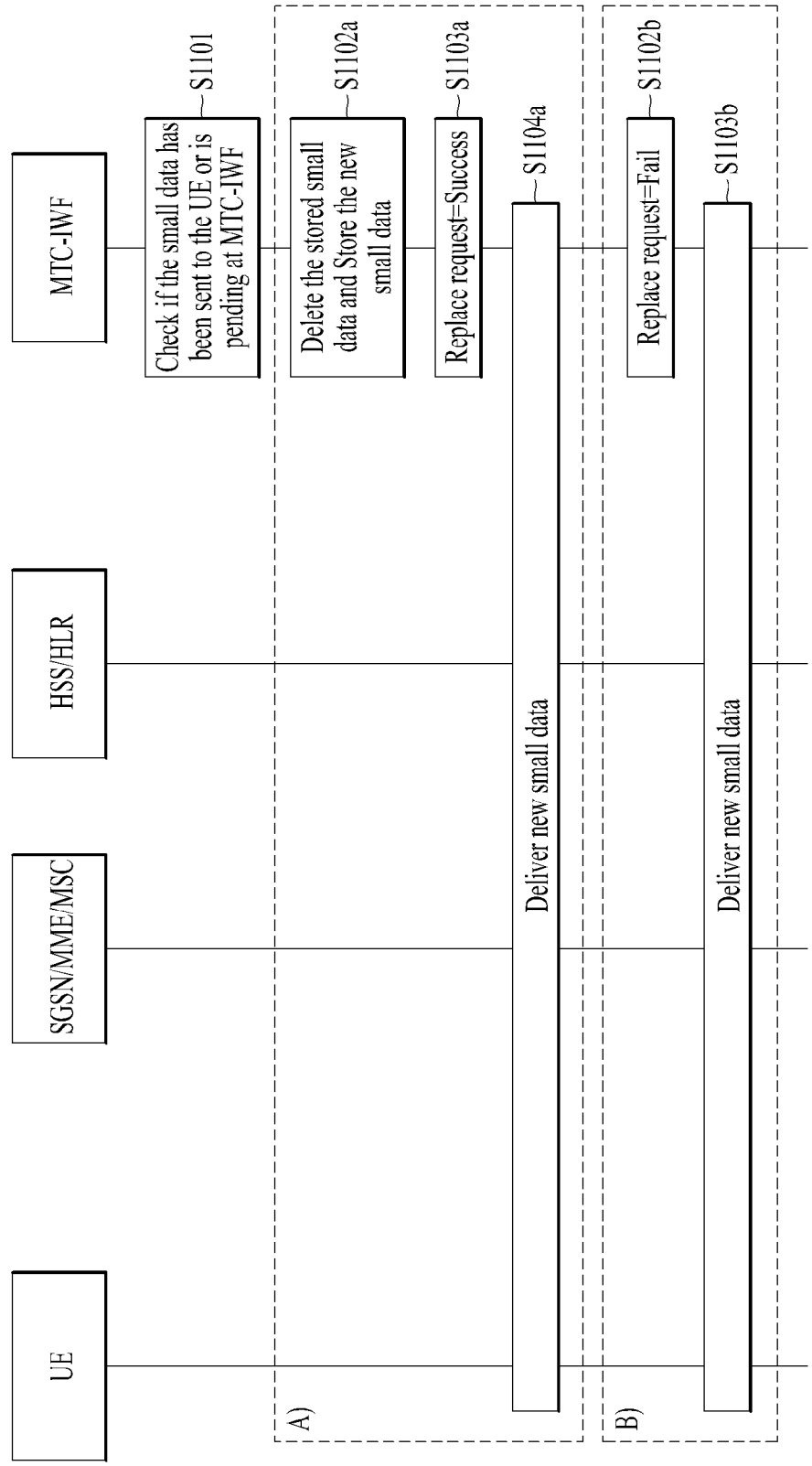
Figure 12:
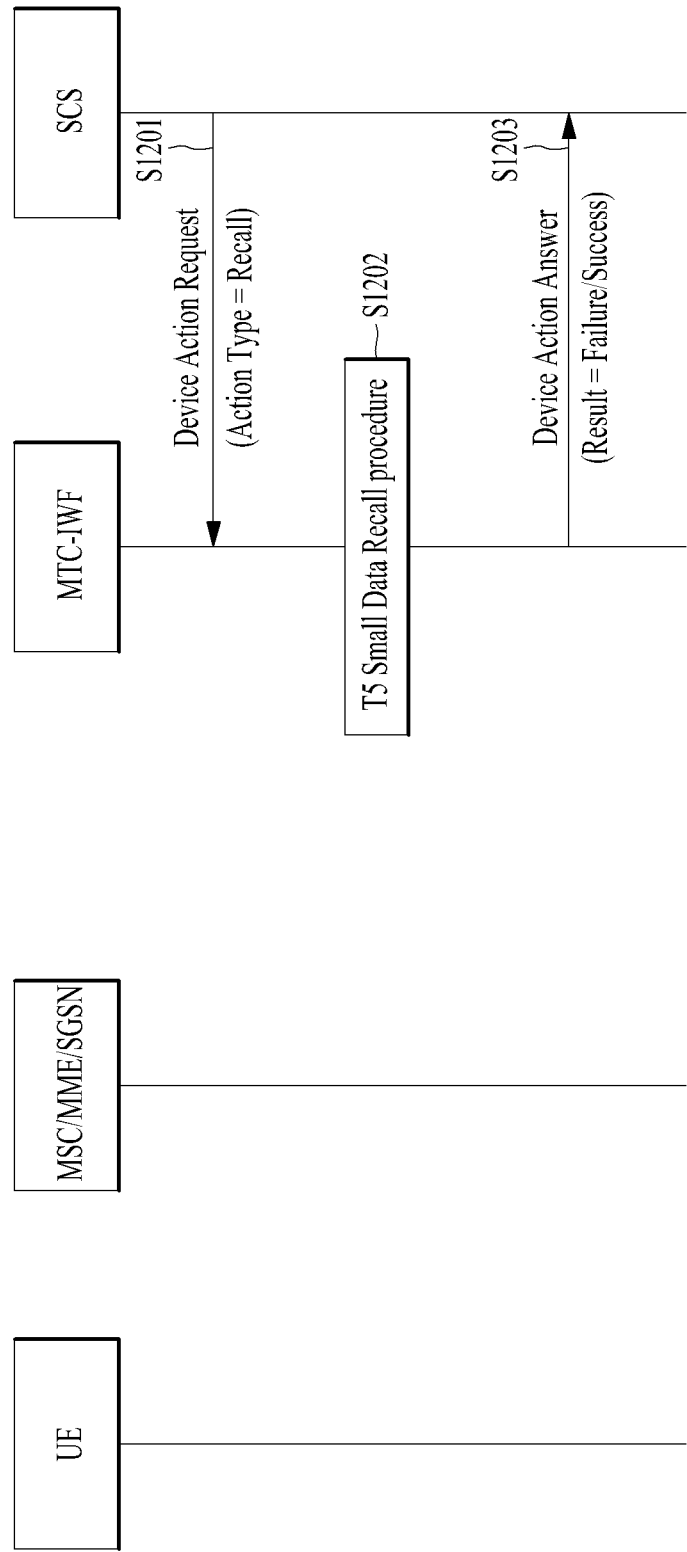

FIG. 11 is a detailed diagram illustrating the small data replacement procedure over the T5 interface performed by the MTC-IWF. Referring to FIG. 11, the MTC-IWF may identify small data to be replaced based on at least one of an external ID, an MSISDN, an SCS ID, and an old small data reference number included in a received small data replace request message (i.e., a message requesting replacement of small data transmitted by the SCS, of which the transmission has been requested by the MTC-IWF) in step S1101. The MTC-IWF checks whether the identified small data has already been transmitted or is pending in the MTC-IWF. If the small data is pending in the MTC-IWF or if the small data has been transmitted to the UE but failed, the MTC-IWF may performs steps S1102a to S1104a. More specifically, the MTC-IWF deletes the stored small data and stores new small data to be delivered when a UE is available in step S1102a. In step S1103a, the MTC-IWF considers that the previously submitted small data has been replaced successfully. When the UE is available, the MTC-IWF delivers the new small data to the UE in step S1104a. For the procedure for delivering the new small data, 5.1.1.3.3.1.1 of 3GPP TR 23.887v1.1.0 may be referred to. If the small data has already been delivered to the UE and the delivery is successful or if the valid period of the small data has already expired, the MTC-IWF considers that the replace request has been failed (e.g. due to successful delivery or time expiration) in step S1102b. In step S1103b, when the UE is available, the MTC-IWF delivers the new small data to the UE. For the procedure for delivering the new small data, 5.1.1.3.3.1.1 of 3GPP TR 23.887v1.1.0 may be referred to.

Embodiment 3b

Cancellation/Recalling of T5 Small Data

An SCS may determine whether there is a need for cancelling/recalling previously submitted small data in step S1201. The SCS may transmit a device action request with Action Type set to Small Data Cancel/Recall Request (including an external ID or MSISDN, an SCS ID, and an old small data reference number or a trigger reference number) to an MTC-IWF. The old small data reference number (or the trigger reference number) may indicate a small data reference number allocated to the previously submitted small data that the SCS wants to cancel. For the operation for recalling the previously submitted small data, the SCS may include a reference number (or ID or indicator) of small data in a small data transmission request transmitted to the MTC-IWF.

If the SCS exceeds a quota or rate of small data submission to a Tsp interface, the MTC-IWF may reject the device trigger action request message with Action Type set to Small Data Cancel/Recall Request, received from the SCS. The MTC-IWF may transmit a response message indicating rejection (together with a cause value indicating the cause of the failure) to the SCS and does not perform the subsequent steps.

In step S1202, the MTC-IWF performs a small data cancellation/recalling procedure over the T5 interface. This will be described later in detail with reference to FIG. 13.

In step S1203, the MTC-IWF may indicate success or failure of small data cancellation/recalling in a device action response message to the SCS. In other words, the MTC-IWF transmits a response message to the small data recall request or a message indicating the result to the SCS.

Figure 13:
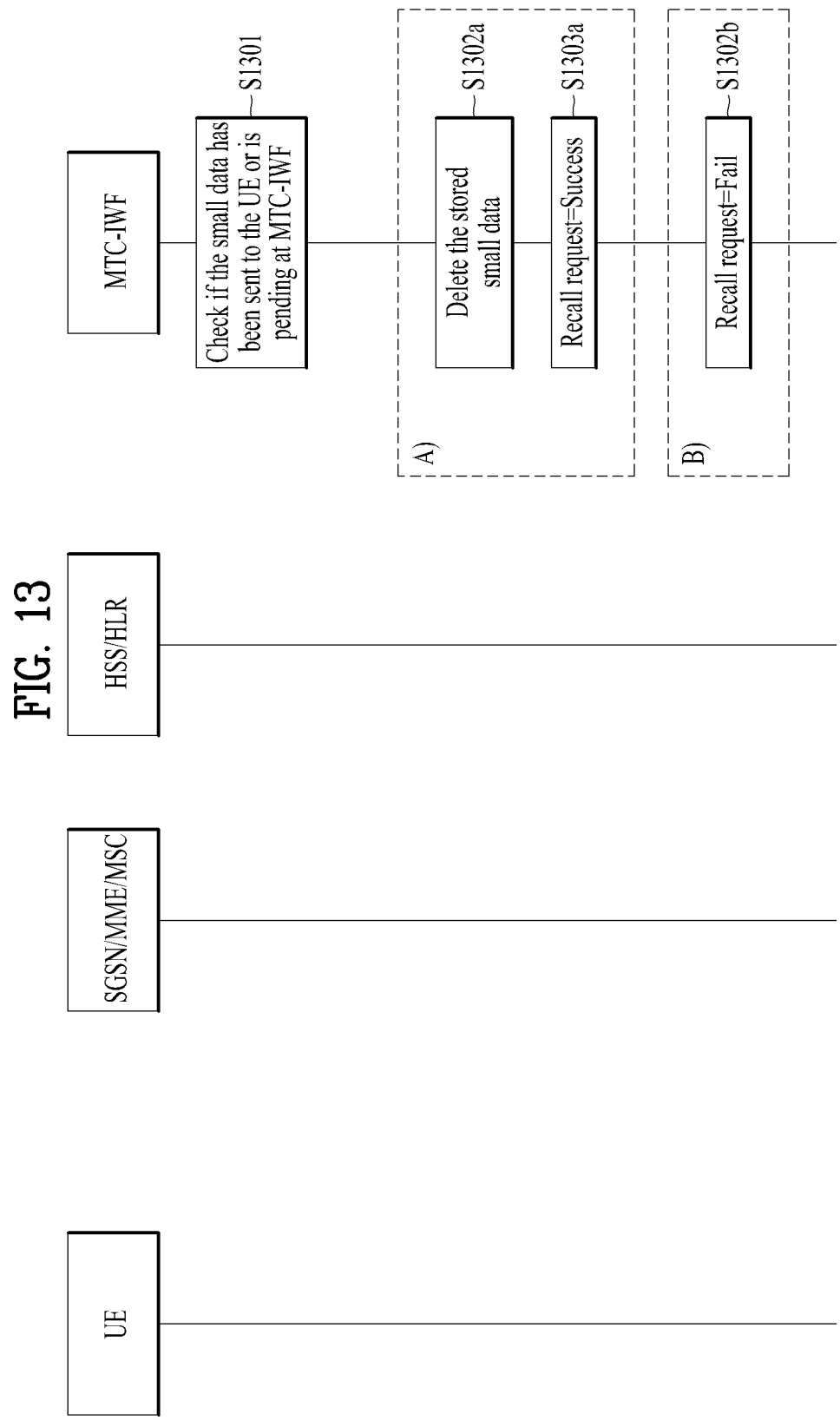

Referring to FIG. 13, the MTC-IWF may identify small data to be canceled based on at least one of an external ID, an MSISDN, an SCS ID, and an old small data reference number included in a received small data cancel/recall request message (i.e., a message requesting cancellation/recalling of small data transmitted by the SCS, of which the transmission has been requested by the MTC-IWF) in step S1301. The MTC-IWF checks whether the identified small data has already been transmitted to a UE or is pending in the MTC-IWF. If the small data is pending in the MTC-IWF or if the small data has been transmitted to the UE but failed, the MTC-IWF may performs steps S1302a and S1303a. More specifically, the MTC-IWF deletes the stored small data in step S1302a. In step S1303a, the MTC-IWF considers that the previously submitted small data has been cancelled/recalled successfully. If the small data has already been delivered to the UE and the delivery is successful or if the valid period of the small data has already expired, the MTC-IWF considers that the cancel/recall request has been failed (e.g. due to successful delivery or time expiration) in step S1302b.

In the above description, if the UE is roaming, the MTC-IWF that replaces or cancels/recalls a device trigger/small data may be located in an HPLMN of the UE or a PLMN to which the UE has registered, that is, a visited PLMN.

Apparatus According to Embodiment of the Present Invention

Figure 14:
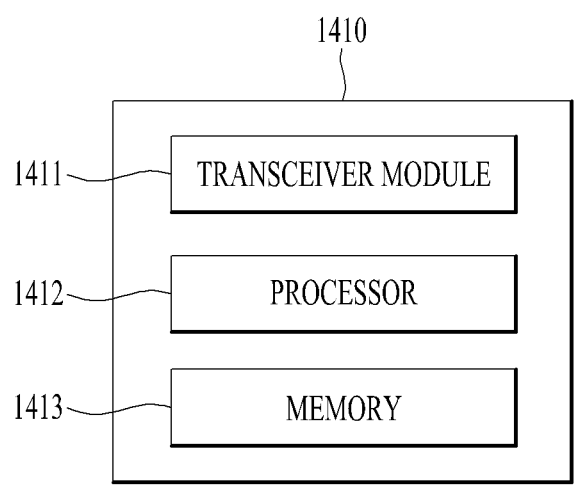
FIG. 14 is a block diagram of an apparatus according to an embodiment of the present invention.

FIG. 14 is a block diagram of a UE and a network node according to a preferred embodiment of the present invention.

Referring to FIG. 14, an apparatus 1410 according to the present invention may include a transceiver module 1411, a processor 1412, and a memory 1413. The transceiver module 1411 may be configured to transmit signals, data, and information to an external device (a network node (not shown) and/or a server (not shown)) and to receive signals, data, and information from the external device. The processor 1412 may provide overall control to the apparatus 1410 and may be configured to compute and process information to be transmitted to or received from an external device. The memory 1413 may store the computed and processed information for a predetermined time and may be replaced with a component such as a buffer (not shown).

According to an embodiment of the present invention, the processor of the apparatus 1410 may process operations required for implementation of the foregoing embodiments.

The specific configuration of the above-described apparatus 1410 may be implemented so that the foregoing various embodiments of the present invention may be applied independently or two or more of them may be applied simultaneously. To avoid redundancy, the same description is not provided herein.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Further, it is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The afore-described embodiments of the present invention are applicable to various mobile communication systems.

The invention claimed is:

1. A method for performing device trigger replacing/recalling by a Short Message Service-Service Center (SMS-SC) in a wireless communication system, the method comprising:

receiving a first message including an old trigger reference number from a Machine Type Communication-InterWorking Function (MTC-IWF);

when the first message having no new trigger reference number includes the old trigger reference number, deleting a trigger message corresponding to the old trigger reference number; and storing a new trigger message corresponding to the new trigger reference number with deletion of the trigger message corresponding to the old trigger reference number, when the first message includes both the old trigger reference number and the new trigger reference number.

2. The method according to claim 1, wherein the first message is based on a second message related to a device trigger that the MTC-IWF has received from a Services Capability Server (SCS).

3. The method according to claim 2, wherein the second message related to the device trigger requests one of trigger replacement and trigger recalling.

4. The method according to claim 2, wherein only if the second message requests trigger replacement, the first message includes the new trigger reference number.

5. The method according to claim 2, wherein if the second message requests trigger recalling, the first message does not include the new trigger reference number.

6. The method according to claim 2, wherein if the SCS exceeds a quota or rate of trigger submission to a Tsp interface, the second message is rejected by the MTC-IWF.

7. The method according to claim 1, wherein the MTC-IWF selects the SMS-SC as an SMS-SC to receive the first message from among a plurality of SMS-SCs based on configuration information.

8. A method for performing small data replacing/recalling by an MTC-IWF in a wireless communication system, the method comprising:

identifying small data to be replaced/recalled based on an old small data reference number included in a first message;

when the first message having no new small data reference number includes the old small data reference number, the MTC-IWF deletes the small data, deleting the identified small data; and storing new small data corresponding to the new small data reference number with deletion of the small data corresponding to the old small data reference number, when the first message includes both the old small data reference number and the new small data reference number.

9. The method according to claim 8, further comprising receiving the first message from an SCS.

10. The method according to claim 9, wherein the first message requests one of small data replacement and small data recalling.

11. The method according to claim 9, wherein only if the first message requests small data replacement, the first message includes a new small data reference number.

12. The method according to claim 9, wherein if the SCS exceeds a quota or rate of trigger submission to a Tsp interface, the first message is rejected by the MTC-IWF.

13. The method according to claim 8, wherein if the identified small data is pending in the MTC-IWF or delivery of the identified small data to a User Equipment (UE) has been failed, the identified small data is deleted.

14. The method according to claim 8, wherein if the identified small data has been delivered successfully to a UE, the replacement/recalling of the small data is considered to be failed.

15. The method according to claim 8, wherein the small data is a device trigger message.

* * * * *